US012562072B2

(12) United States Patent
Imaezue et al.

(10) Patent No.: US 12,562,072 B2
(45) Date of Patent: Feb. 24, 2026

(54) ADAPTIVE AUDIO AND AUDIOVISUAL RECURSIVE SELF-FEEDBACK FOR SPEECH THERAPY

(71) Applicant: UNIVERSITY OF SOUTH FLORIDA, Tampa, FL (US)

(72) Inventors: Gerald Imaezue, Tampa, FL (US); Ofer Tchernichovski, New York, NY (US); Mira Goral, New York, NY (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 19/043,386

(22) Filed: Jan. 31, 2025

(65) Prior Publication Data

US 2025/0246089 A1 Jul. 31, 2025

Related U.S. Application Data

(60) Provisional application No. 63/752,487, filed on Jan. 31, 2025, provisional application No. 63/627,136, filed on Jan. 31, 2024.

(51) Int. Cl.
*G09B 5/06* (2006.01)
*G10L 15/22* (2006.01)

(52) U.S. Cl.
CPC ............... *G09B 5/06* (2013.01); *G10L 15/22* (2013.01); *G10L 2015/225* (2013.01)

(58) Field of Classification Search
CPC ............. G09B 5/00; G09B 7/00; G09B 19/03
See application file for complete search history.

(56) References Cited

U.S. PATENT DOCUMENTS

| | | | |
|---|---|---|---|
| 8,185,373 B1 * | 5/2012 | Messenger | G06F 40/51 704/9 |
| 8,385,812 B2 * | 2/2013 | Bertelsen | G09B 7/02 434/323 |
| 11,594,149 B1 * | 2/2023 | Edalat | G10L 25/66 |

* cited by examiner

*Primary Examiner* — Robert J Utama
(74) *Attorney, Agent, or Firm* — HUSCH BLACKWELL LLP

(57) ABSTRACT

Systems and methods are provided for generating, managing, adapting, and delivering speech therapy to a user via a mobile device in an at-home or out-of-clinic setting. Users may be persons experiencing aphasia or other speech conditions. For example, prompts may be communicated to a user, and their spoken responses recorded and analyzed. Based on analysis of the responses, these systems and methods may determine a mode of response including but not limited to playback of the user's spoken response to allow the user to recursively self-assess and/or self-correct. User performance and improvement trends may be assessed, and utilized to adapt future therapy sessions.

14 Claims, 16 Drawing Sheets

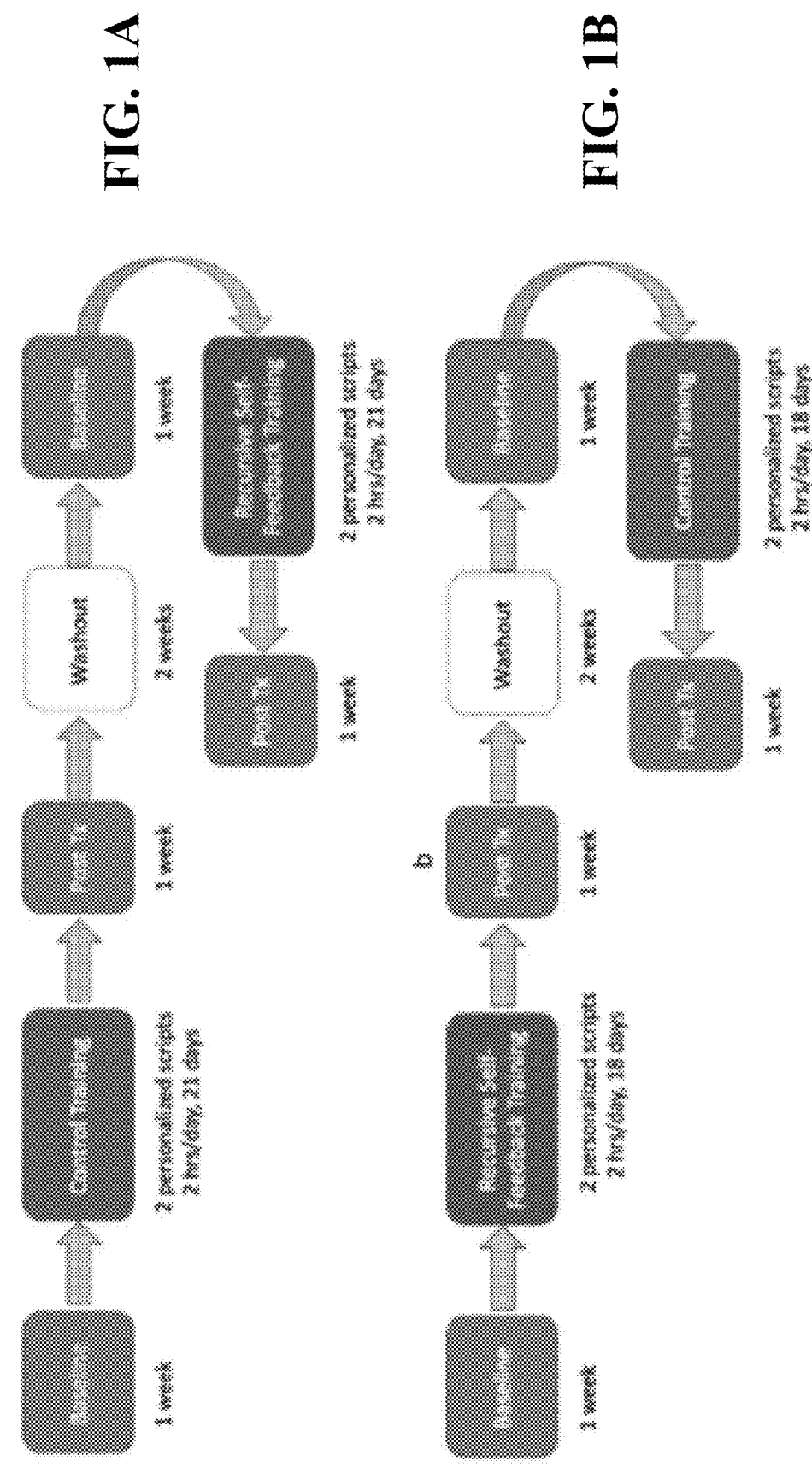

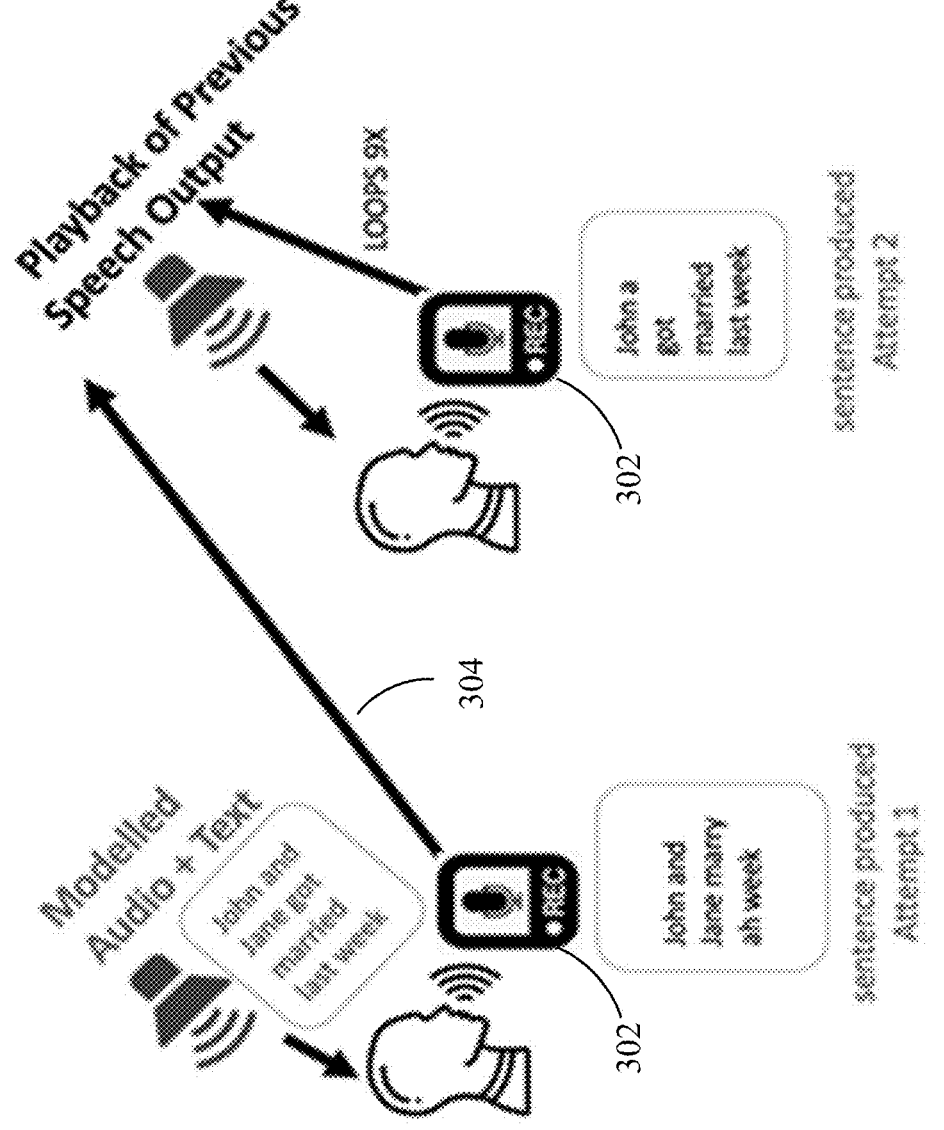
FIG. 3

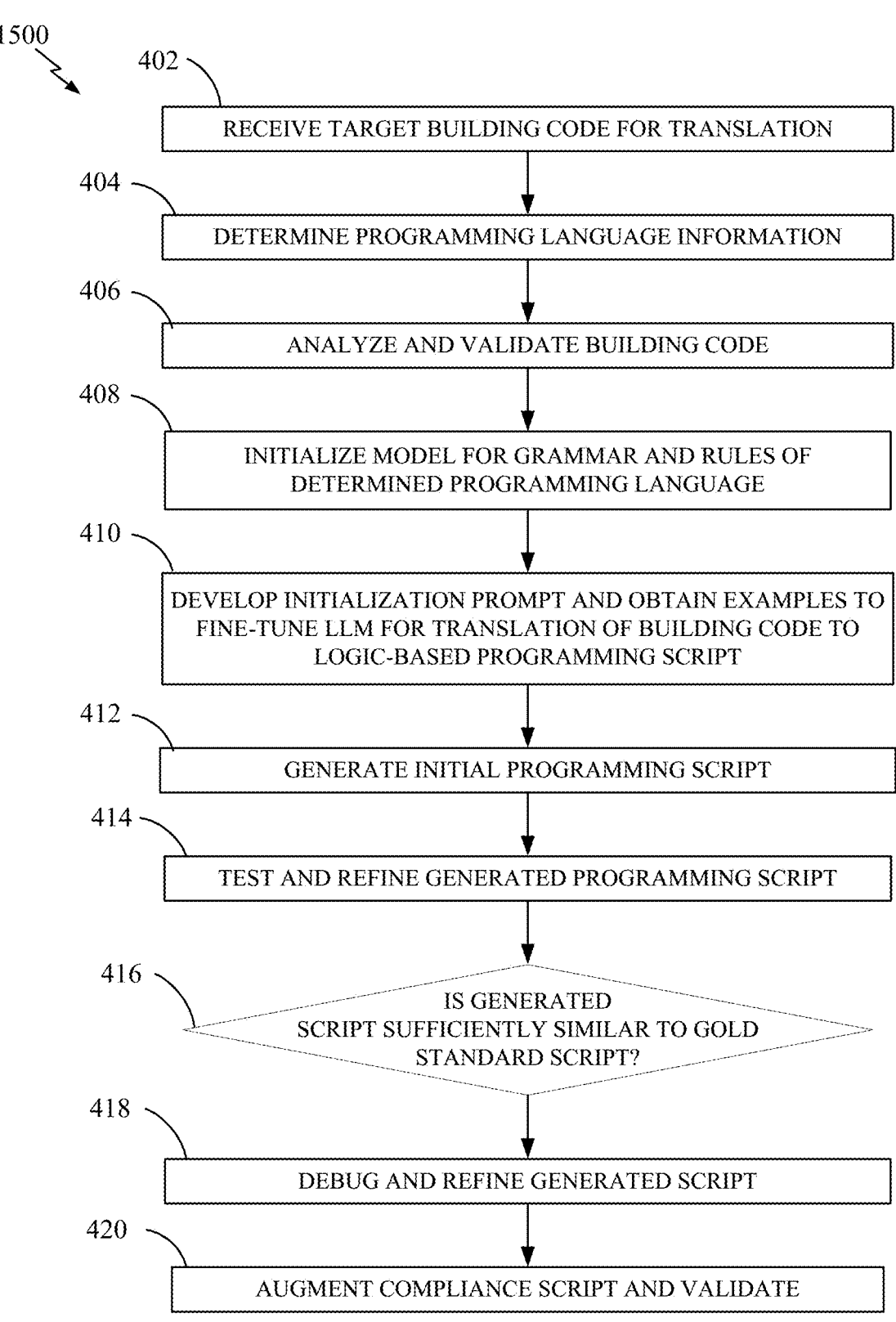

1500

402

RECEIVE TARGET BUILDING CODE FOR TRANSLATION

404

DETERMINE PROGRAMMING LANGUAGE INFORMATION

406

ANALYZE AND VALIDATE BUILDING CODE

408

INITIALIZE MODEL FOR GRAMMAR AND RULES OF DETERMINED PROGRAMMING LANGUAGE

410

DEVELOP INITIALIZATION PROMPT AND OBTAIN EXAMPLES TO FINE-TUNE LLM FOR TRANSLATION OF BUILDING CODE TO LOGIC-BASED PROGRAMMING SCRIPT

412

GENERATE INITIAL PROGRAMMING SCRIPT

414

TEST AND REFINE GENERATED PROGRAMMING SCRIPT

416

IS GENERATED SCRIPT SUFFICIENTLY SIMILAR TO GOLD STANDARD SCRIPT?

418

DEBUG AND REFINE GENERATED SCRIPT

420

AUGMENT COMPLIANCE SCRIPT AND VALIDATE

FIG. 15

ADAPTIVE AUDIO AND AUDIOVISUAL RECURSIVE SELF-FEEDBACK FOR SPEECH THERAPY

CROSS-REFERENCE TO RELATED APPLICATION(S)

The present disclosure claims priority to U.S. Provisional Application No. 63/627,136, filed on Jan. 31, 2024, and U.S. Provisional Application No. 63/752,487, filed on Jan. 31, 2025, the entire contents of which are hereby incorporated by reference in their entirety.

BACKGROUND

Speech and language impairments, such as aphasia, can arise from neurological conditions including stroke, traumatic brain injuries, or degenerative diseases. Aphasia is a condition that affects a person's ability to produce and comprehend language, leading to significant challenges in communication. Individuals with aphasia often experience difficulty forming words, constructing sentences, and maintaining fluency in spontaneous speech. These challenges can severely impact personal, social, and professional interactions, reducing the individual's overall quality of life.

Traditional speech therapy for aphasia and related speech impairments typically involves structured exercises conducted under the guidance of a speech-language pathologist. These interventions often rely on modeling and/or external feedback to reinforce correct speech patterns. For example, typical "modeling" approaches can involve a speech-language pathologist providing an example of correct speech production, which the patient then is expected to imitate or repeat. The pathologist listens to the response, manually assesses accuracy of the repeated speech in real time, and provides feedback to the patient accordingly during the appointment.

However, such methods may require frequent clinical visits, access to specialized providers, and ongoing external reinforcement, making them less accessible to individuals with logistical, financial, or geographic barriers to care as well as less helpful in terms of effectuating speech improvement. For example, existing therapy models do not emphasize real-time self-monitoring from the patient (because the patient is accustomed to, and in a position to, rely on the pathologist for monitoring and correction) and do not allow for ongoing training and iterative speech improvement outside of the clinic, which the inventors have established are critical components of effective language rehabilitation.

Therefore, a need exists for improved systems and methods that enable individuals with speech impairments to engage in effective, independent, regular, and adaptive speech therapy without relying solely on external reinforcement. There is further a need for speech therapy systems that leverage technological advancements to provide structured, data-driven, and dynamically adjustable feedback tailored to the user's evolving speech patterns that can be available on-demand and at regular intervals outside of a clinical setting.

SUMMARY

The following presents a simplified summary of one or more aspects of the present disclosure, to provide a basic understanding of such aspects. This summary is not an extensive overview of all contemplated features of the disclosure and is intended neither to identify key or critical elements of all aspects of the disclosure nor to delineate the scope of any of all aspects of the disclosure. Its purpose is to present some concepts of one or more aspects of the disclosure in a simplified form as a prelude to the more detailed description that is presented later.

In one aspect, the disclosure can provide processes and methods for generating, analyzing, adapting, and/or delivering speech therapy based on recursive self-feedback. For example, a method may be provided for delivering recursive self-feedback (RSF)-based speech therapy comprising: loading a user profile, the user profile comprising settings relating to providing recursive self-feedback-based speech therapy; determining a speech prompt to provide to the user as part of the speech therapy, based at least in part on the settings relating to providing RSF-based speech therapy; communicating the speech prompt to the user, via a local computing device; recording a first audible response attempt spoken by the user in response to the speech prompt; determining at least one of an accuracy or a speech performance metric of the first audible response attempt relative to an expected speech response; determining that, based on a first accuracy or speech performance metric, a mode of response should be generated from which the user can engage in recursive self-feedback; generating a first feedback response based on the first audible response attempt, the first feedback response including at least one of: an audio recording of the user's first audible response attempt, a text representation of the user's first audible response attempt, or a synthetic response derived from the user's first audible response attempt; communicating the first feedback response to the user via the computing device; recording a second audible response attempt spoken by the user in response to the first feedback response; determining that, based on a second accuracy or speech performance metric, a mode of response should be generated from which the user can engage in further recursive self-feedback regarding the speech prompt; generating a second feedback response based on the second audible response attempt, the second feedback response including at least one of: an audio recording of the user's second audible response attempt, a text representation of the user's second audible response attempt, or a synthetic response derived from the user's second audible response attempt recording a third audible response attempt spoken by the user in response to the second feedback response; adapting subsequent speech prompts or recursive feedback iterations based on analysis of the third audible response attempt; and storing session data in association with the user profile to track therapy progress over time.

In another respect, the present disclosure provides systems, networks, and devices that can support methods involving recursive self-feedback based speech therapy, including methods which are configured to implement the inventors' discoveries and findings described herein. For example, the present disclosure may provide a system for providing recursive self-feedback (RSF)-based speech therapy, the system comprising: a visual display; an audio output device; a microphone; a user input device configured to allow the user to input information; a communication interface; a processor; and a memory storing software instructions that, when executed by the processor, cause the system to: load a user profile, the user profile comprising speech therapy data of the user's previous speech performance; determine a speech prompt to present to the user based on the speech therapy data; communicate the speech prompt to the user via at least one of the display or the audio output device; record a first audible response attempt spoken by the user in response to the speech prompt via the microphone; analyze a file representing a recording of the first audible response attempt to determine at least one of an accuracy metric or a speech performance characteristic relative to an expected response; determine, based on the accuracy metric or speech performance characteristic, whether to communicate one or more subsequent speech prompts configured to engage the user in recursive self-feedback, including a number of recursive feedback iterations to present to the user; generate a first feedback response based on the first audible response attempt, the first feedback response including at least one of: an audio recording of the user's first audible response attempt, a text representation of the first audible response attempt, or a synthetic response derived from the first audible response attempt; communicate the first feedback response to the user via at least one of the display or the audio output device; record at least one subsequent audible response attempt from the user in response to the first feedback response; store session data in the memory, including user performance metrics indicative of: a frequency and average percentage-per-prompt of speech errors, a number of recursive feedback iterations completed by prompt, and a degree of speech fluency improvement; and adapt settings of the user profile so that speech prompts and recursive feedback iterations of future therapy sessions progressively adjust therapy difficulty levels and optimize speech rehabilitation improvement for the user.

These and other aspects of the disclosure will become more fully understood upon a review of the drawings and the detailed description, which follows. Other aspects, features, and embodiments of the present disclosure will become apparent to those skilled in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. Similarly, while example embodiments may be discussed below as devices, systems, or methods embodiments it should be understood that such example embodiments can be implemented in various devices, systems, and methods.

BRIEF DESCRIPTION OF THE DRAWINGS

FIGS. 1A and 1B are a pair of flowcharts indicating protocols used in a study performed by the inventors.

FIG. 3 is a diagram conceptually depicting a sequence of prompts, responses, and feedback according to some embodiments.

FIG. 15 is a flowchart illustration concepts of example processes according to some embodiments.

DETAILED DESCRIPTION

Figure 2B:
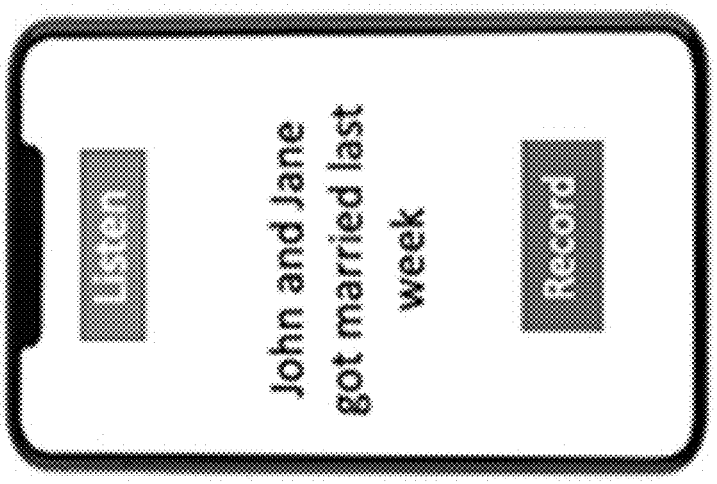
FIGS. 2A and 2B are a pair of conceptual illustrations comparing user interfaces employed in studies performed by the inventors.

The detailed description set forth below in connection with the appended drawings is intended as a description of various configurations and is not intended to represent the only configurations in which the subject matter described herein may be practiced. The detailed description includes specific details to provide a thorough understanding of various embodiments of the present disclosure. However, it will be apparent to those skilled in the art that the various features, concepts and embodiments described herein may be implemented and practiced without these specific details. In some instances, well-known structures and components are shown in block diagram form to avoid obscuring such concepts.

This detailed description will include several sections that discuss aspects of the disclosure from various levels of detail and various perspectives. In particular, these sections will include: discussion of approaches, frameworks and associated general concepts that may be applicable to some or all of the more specific implementations contemplated herein; a discussion of the inventors' experiments and examples/prototypes used for validation and other studies; and descriptions of various embodiments or ways of implementing the systems and methods described herein. Thus, the descriptions of specific embodiments/implementations/examples should be understood to be capable of incorporating the more general frameworks and concepts as well as features of other specific embodiments, and vice versa.

Thus, the present disclosure also contemplates taking the general improvements, algorithms, and advantages described herein and deploying them into practical implementations and systems, so as to leverage the improvements and algorithms for specific applications and real-world situations.

Example Processes for Providing Speech Therapy and Other Speech Assistance

Referring now to FIG. 15, a process 1500 is illustrated, depicting a general example for actions involved in a method for providing recursive self-feedback speech therapy to a patient. Process 1500 may be implemented by a computing system that includes one or more servers, mobile applications, cloud-based processing resources, and data storage systems. In some embodiments, portions of process 1500 may be executed on a patient's mobile device, while other portions may be executed on remote computing infrastructure managed by a therapy service provider or EMR.

At block 1502, process 1500 determines a therapy prescription for a person experiencing a speech condition such as aphasia. The therapy prescription need not be a "prescription" in the sense of a licensed physician prescribing it, but rather may also simply be a manner in which to detail and specify its parameters. The therapy prescription may define parameters such as therapy frequency, session duration, scripted statements to be used, speech fluency targets, topics of interest, age/comprehension level, and feedback customization.

For example, in some embodiments, process 1500 may determine the prescription via input from the person's healthcare provider(s), such as by providing a secure web-based clinician portal into which a healthcare provider can input or configure the prescription in the form of therapy session settings. Process 1500, in some embodiments, can allow the provider to log into the portal (such as with multi-factor authentication, or via EMR credentials), where the provider can access a dashboard that displays patient profile(s), historical progress data, and customizable therapy parameters. The portal may guide the healthcare provided to define the prescription settings through a structured user interface, including drop-down menus, toggles, and text fields to allow configuration of frequency, session duration, scripted statement complexity, feedback sensitivity, and patient engagement preferences. Process 1500 may then encrypt and transmit the configured settings to the patient's mobile application via a cloud-based server, ensuring secure deployment of the prescribed therapy, or may save such settings to the patient's profile such that the settings are utilized when the patient logs into a particular app on their mobile device.

Alternatively, process 1500 may autonomously determine a therapy prescription through an initial speech assessment within the mobile application. In such an embodiment, process 1500 presents the patient with a structured evaluation sequence, prompting them to repeat a bank of scripted statements stored either locally on the device or dynamically retrieved from a cloud-based repository. The statements may be designed to increment in linguistic complexity, ranging from simple phoneme repetitions to grammatically complex sentences. Process 1500 may thus utilize speech-to-text conversion and phoneme similarity analysis to assess the patient's fluency, accuracy, and response time. Based on these metrics, process 1500 may assign an initial difficulty level or initial parameters, and generate a personalized therapy plan. Additionally, process 1500 may include an onboarding questionnaire for the patient to define therapy preferences, such as desired engagement level, comfort with difficulty adjustments, and availability for scheduled sessions. These inputs may further refine the prescribed therapy settings.

In some implementations, process 1500 may alternatively (or additionally) provide adaptive therapy prescription adjustments, dynamically revising and updating certain parameters of the prescription based on ongoing patient performance, engagement, adherence, and progress. Process 1500 may regularly re-evaluate the patient's accuracy and progress, so as to inform periodic assessments of whether increasing or decreasing session intensity may be needed or beneficial. The patient may or may not have visibility into the specific algorithmic adjustments, depending on the application's transparency settings.

Some embodiments may include an option for a patient/user to override prescription settings, such as allowing patients to adjust certain parameters (entirely, and/or within predefined bounds).

At block 1504, process 1500 loads the patient profile and personalized therapy plan. In some embodiments, process 1500 may retrieve patient-specific data from a cloud-based storage system or a local database on the patient's device. The patient profile may include data such as prior session history, speech impairment severity levels, baseline fluency assessments, and therapy preferences. Some implementations may allow healthcare providers to update the patient profile remotely through a secure portal, while other implementations may permit automated updates based on patient performance in prior sessions. The therapy plan may be structured dynamically, adjusting scripted statement selection, feedback intensity, and session duration based on real-time patient progress.

At block 1506, process 1500 schedules therapy sessions. In some implementations, process 1500 may generate a predefined schedule based on clinician recommendations or patient availability settings. The scheduling module may factor in historical patient adherence patterns and dynamically adjust session timing to maximize participation. Notifications may be sent through various communication channels such as push notifications in the mobile application, SMS, or email reminders. In some embodiments, process 1500 may provide rescheduling options, allowing the patient to adjust session times within predefined limits to maintain engagement.

Process 1500 may also take into account the inventors' findings from experimental studies regarding continuous vs. discontinuous scheduling of therapy sessions during a given day, when developing the schedule/prescription. For example, in some implementations, process 1500 may encourage the user to adopt and adhere to a session schedule that intersperses therapy sessions throughout the day, or at least breaks them up so that they do not comprise one long session each day. The inventors have found that discontinuous sessions, which entail predefined or user-directed/spontaneous spacing of therapy sessions throughout the day, rather than a single intensive session, leads to better long-term retention and speech fluency improvements. Thus, process 1500 may suggest spaced scheduling, and/or may prompt or notify the user to stop sessions that are running long, or to start sessions after some period of time has gone by. Additionally, the system may involve an application that integrates with content applications, such as news or sports apps, social media, etc., and interrupt the user's browsing by highlighting text in an article or post and asking the user to speak the text and do a spontaneous training session involving content the user was already viewing. The system may adaptively adjust session timing based on patient performance trends, prioritizing spaced practice schedules when beneficial.

At block 1508, process 1500 initiates a therapy session via the mobile application. In some embodiments, process 1500 may verify patient identity through biometric authentication or secure login credentials before retrieving therapy session parameters. The system may load pre-configured scripted statements and relevant speech exercises from a cloud-based server or local storage. Some implementations may incorporate an introductory session guide, presenting an overview of the upcoming session objectives and expected outcomes before the session begins.

The therapy session may be a delivered via a dedicated mobile app, such as described below in reference to the inventors' validation studies. The app may allow a user to start, pause, and stop the therapy session, and may present a simplified interface so as not to be distracting.

At block 1510, process 1500 presents a scripted statement and captures the patient's verbal response. The system may deliver an auditory or visual prompt for the scripted statement through the mobile application, such as by displaying scripted statements (e.g., sentences, questions, clauses, phrases, words, etc.) in textual form on a screen, or by audibly play a recording of someone ready the scripted statements, or by having a native digital assistant or text to speech engine reproduce the scripted statements via a speaker. The patient may then articulate a response, which is recorded using the device's microphone. In some examples, the application may allow a user to press (and/or hold) a button on the screen or device, throughout the period of time in which the user intends to speak, so as to engage the microphone and provide a clue as to whether a given pause or silence was meant to be the conclusion of an uttered statement or not. The system may store the recorded response locally or upload it to a cloud-based storage system for further processing.

At block 1512, process 1500 converts the recorded speech to text and assesses the accuracy of the response. The system may utilize speech-to-text processing combined with pho-neme similarity analysis to compare the spoken response against the expected scripted statement. Accuracy may be determined based on phonetic precision, timing, and fluency. In some embodiments, in addition to merely determining whether the user has accurately spoken the expected text, process 1500 may also (or alternatively) calculate various additional performance metrics regarding the user's response. For example, as described below, some embodi-ments may assess rate of speech, delays in speaking, etc. as measures of performance and improvement. To determine these metrics, audio of the user's spoken response may be analyzed to determine time taken to speak each word, total time taken to speak the entire response, delay prior to initiating response, pauses in response, etc., such as described below.

At block 1514, process 1500 determines the mode of its feedback to the user, based on the accuracy and/or perfor-mance assessment. In some embodiments, if the response meets predefined accuracy and/or performance criteria, pro-cess 1500 may indicate correctness and proceed to the next scripted statement. If inaccuracies or non-optimal perfor-mance are detected, process 1500 may determine whether to provide recursive self-feedback or other corrective mecha-nisms based on past error trends and patient performance history.

At block 1516, process 1500 provides recursive self-feedback-based iterative training for incorrect responses. The system may replay the patient's prior response, allow-ing self-monitoring and correction. In some implementa-tions, the RSF mechanism may highlight differences between the patient's response and the expected phrase through visual overlays or audio modulation. The system may provide multiple types of self-feedback, such as slow-ing down the original model response, breaking it into phoneme-by-phoneme replay, or offering real-time pitch and articulation guidance.

Alternative RSF methods may involve interactive prompts that guide the patient through gradual correction, leveraging AI-driven phoneme modeling to provide hints. The system may display the original scripted statement alongside the patient's transcribed response, allowing for a direct textual comparison. Additionally, a color-coded accu-racy indicator may be used to highlight specific words or phonemes that need improvement. In some implementa-tions, process 1500 may provide a user-selectable button or automated prompt to initiate playback of their prior response, allowing the patient to hear their speech in contrast to the target phrase. In further embodiments, the playback of the user's prior response may be augmented (or sometimes augmented, such as after several attempts have already been made). Such augmentations may include a playback of a synthesized version of the user's voice speaking the correct/expected response, or a modified playback of the response that was filtered so as to improve clarity of, or isolate, the user's voice or a reduced speed to emphasize the user's actual spoken words.

After the recursive feedback prompt was provided (in whatever form), the process 1500 may return to block 1512 to record the user's response and make a new assessment at block 1514. This can continue for several feedback cycles, until the process 1500 determines it should stop. The number of feedback cycles in RSF training may vary depending on patient accuracy, difficulty level, and engagement patterns. In some embodiments, process 1500 may dynamically deter-mine the number of cycles based on the severity of speech deviations, past performance trends, and clinician-defined therapy goals. For example, if the system detects frequent articulation errors in a specific phoneme, it may increase the number of replay attempts before moving forward. Con-versely, if the patient consistently demonstrates improve-ment, process 1500 may reduce the number of iterations or introduce randomized verification cycles to assess retention.

Some embodiments may also include adaptive reinforce-ment mechanisms that adjust feedback intensity based on session progression. For instance, initial training sessions may provide extensive feedback, while later sessions may gradually reduce reliance on replay mechanisms to encour-age independent speech monitoring.

At block 1514, if the process 1500 determines that the user's response was sufficiently accurate (e.g., 90% cor-rectly spoken words) and met performance criteria, then depending upon settings of the therapy prescription and/or user profile for session duration, process 1500 may either present the next prompt by returning to block 1510, or if the session should end, the process may move on to block 1518.

At block 1518, process 1500 logs session data and per-formance metrics. The system may record total session duration, number of iterations completed, speech fluency trends, and patient adherence to therapy schedules, storing the data in a cloud-based or local storage system for later review.

At block 1520, process 1500 may analyze session perfor-mance and determine whether and how to adjust the therapy plan/prescription accordingly. Updates may include modi-fying difficulty levels, feedback intensity, or session duration based on real-time patient progress and/or engagement.

At block 1522, process 1500 optionally generates a report summarizing patient progress and, in some embodiments, transmits it to a healthcare provider.

At block 124, process 1500 ends the session and sched-ules the next therapy activity based on prescribed parameters and real-time adjustments.

Example Systems, Networks, and Platforms

Figure 16:
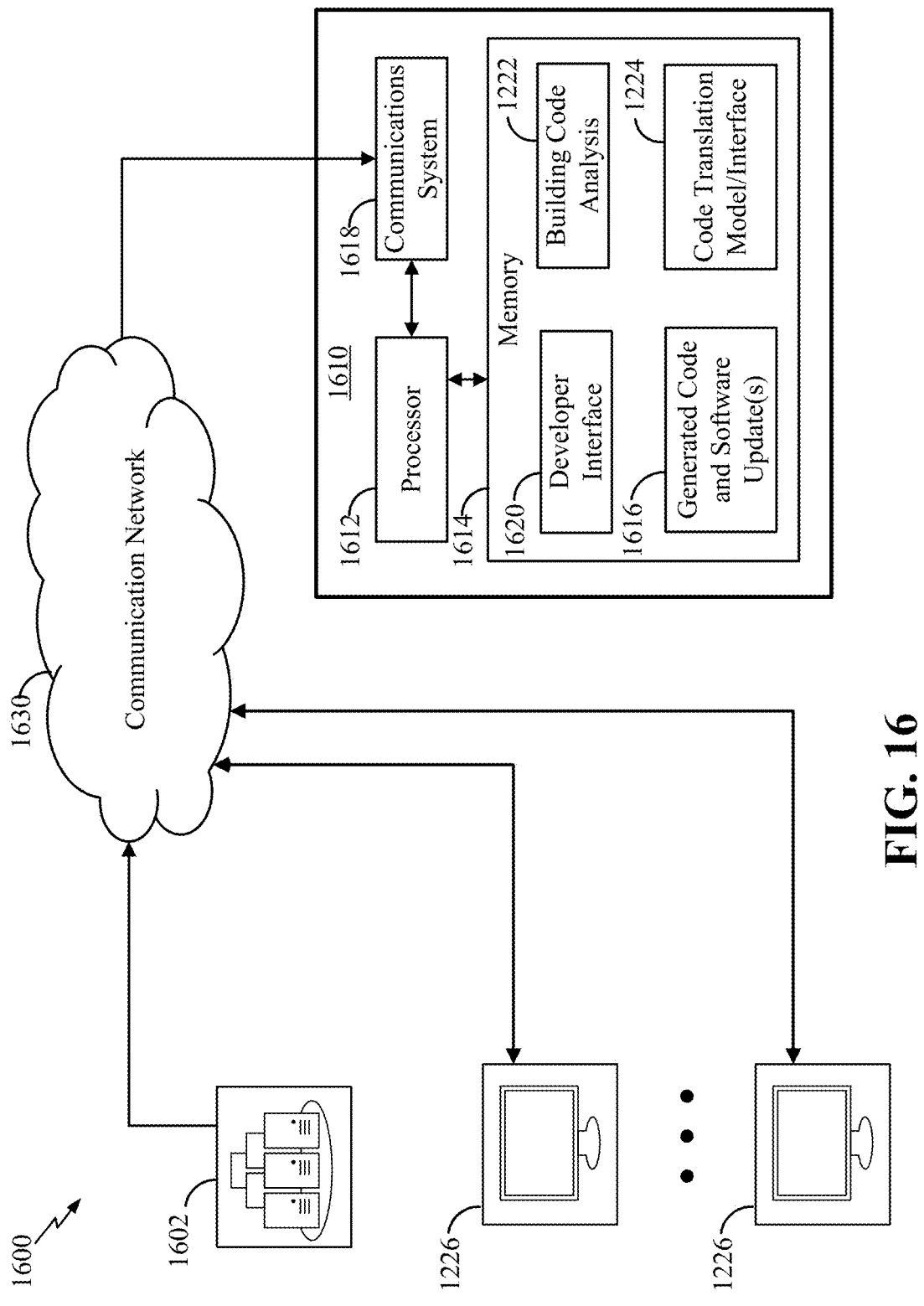
FIG. 16 is a block diagram conceptually illustrating hardware components, attributes, and connections of systems and devices according to some embodiments.

FIG. 16 is a conceptual block diagram illustrating a system 1600 for implementing the processes described in FIG. 15 and elsewhere throughout this disclosure. In one respect, system 1600 can be thought of as an integrated platform for facilitating, monitoring, and managing recur-sive self-feedback (RSF) speech therapy. In another respect, system 1600 may represent a distributed architecture where different computational tasks are executed across various devices and cloud-based infrastructure.

As shown, system 1600 includes a mobile device 1602, which may be a smartphone, tablet, or specialized speech therapy device. Mobile device 1602 may execute a therapy application that presents scripted statements, records patient responses, provides recursive self-feedback, and logs session data. Mobile device 1602 may include subcomponents such as a processor 1610, which may be a general-purpose processor, application-specific integrated circuit (ASIC), graphics processing unit (GPU), or other dedicated hardware optimized for speech processing and machine learning tasks. A memory 1612, which may be volatile (RAM) or non-volatile (ROM, flash storage, SSD), can store patient profiles 1650 (including user preferences and/or therapy settings), and software/application data 1652. Additionally, mobile device 1602 includes a display screen 1614, a microphone 1616 for capturing patient speech, a user input 1620 (e.g., touchscreen, keyboard, or voice commands), and a communications interface 1618, which may support Wi-Fi, Bluetooth, cellular (3G, 4G, 5G), or other network connectivity options to transmit data to server 1604 or other remote systems.

In some configurations, system 1600 further includes a remote resource such as a server 1604, which may facilitate therapy prescription management, data processing, and analytics. Server 1604 may include multiple processing cores or computational resources, a database for storing therapy prescriptions, prompt segmentations, user profiles, patient progress logs, historical speech data, and one or more network interfaces for secure data transmission. In some embodiments, server 1604 may integrate with or transmit data to a variety of external sources, such as a cloud-based or hosted LLM 1640, and/or an electronic medical records (EMR) system 1642 to provide seamless access to patient data for healthcare providers. Server 1604 may also host a web-based provider portal, allowing clinicians associated with healthcare being provided to the user via EMR 1642 to remotely monitor patient progress, configure therapy settings, and review AI-generated reports on speech accuracy trends, fluency improvements, and engagement levels.

A workstation 1642 may be provided for healthcare providers or speech-language pathologists to configure therapy prescriptions and review patient progress. Workstation 1642 may be a standalone computer, a cloud-based interface, or an integrated component of an EMR system. Workstation 1642 may include a graphical user interface (GUI) that displays patient session logs, adherence reports, and automated insights generated by server 1604. In some implementations, workstation 1604 may allow providers to fine-tune therapy plans, adjust scripted statement complexity, and manually override automated prescription settings.

A communication network 1630 connects mobile device 1602, server 1604, and workstation/EMR 1642. Communication network 1630 may include the Internet, cellular networks, local area networks (LANs), or other communication pathways. The network may facilitate real-time data exchange, remote therapy session scheduling, and software updates for the mobile application. The system may support end-to-end encryption protocols to ensure data security and privacy compliance.

In some embodiments, system 1600 may further include cloud-based storage and processing resources, enabling scalable data management and computationally intensive operations such as natural language processing, phoneme similarity analysis, and automated speech error detection. Cloud services may allow seamless syncing of therapy progress across multiple devices, ensuring that therapy sessions remain uninterrupted even if a patient switches devices.

Example Data and Validation Experiments

The inventors conducted a variety of studies, looking at several different comparisons and outcome measures, to validate the RSF-based techniques described herein. This Experiments section sets forth a discussion of those studies and findings, but should not be understood as limiting of the more general scope of this disclosure. Furthermore, while the systems and methods employed in these studies may or may not have included all of the features, alternatives, equipment, etc. that are contemplated herein, the studies still nonetheless validate that the subject matter hereof represents a clear improvement in the field and a clear improvement over prior methods for providing speech therapy.

The inventors believed, based on analysis of reported data, that PWNA have difficulties with using self-feedback in real-time to improve their language production. For instance, prior studies have examined vocal compensation, i.e., responding to pitch shift, in PWNA through the delayed or altered auditory feedback paradigm. These studies show, for example, that PWNA have difficulties with real-time error processing and correction abilities. Interestingly, the inventors found that PWNA can benefit from script-based therapy with offline (i.e., postproduction) playback of their own speech, because it provides PWNA more time to monitor and correct their own speech errors and improve their language production when repeating sentences.

In their validation studies, the inventors took a novel approach to enabling a self-feedback form of therapy. Instead of providing playback of PWNA speech after each time they imitate a proficient speech model, the studies allowed self-feedback to propagate recursively for each spoken sentence, without subsequent guidance by an SLP. This recursive self-feedback technique involves the application of several self-feedback loops during performance of a specific task or learning a specific behavior. For the initial study, the target behavior was script reproduction. In this manner, the inventors provided PWNA with opportunities to gradually monitor, detect, minimize, or correct errors and improve their language production over time. Note that the term 'recursive' includes the concept that the output of PWNA performance can become the reference (input) for the next performance, and so forth, in an automated closed feedback loop.

Both the control and recursive self-feedback trainings were based on computerized script-based treatments. Script-based treatments allow for attaining automaticity in the production of personalized scripts through improving accuracy and speaking rate in the production of the scripts by PWNA. A clinician or virtual speaker provides a model of the speaking rate and accuracy, and the patients attempt to imitate the model and to achieve automaticity in the imitation. To achieve this, computerized script-based treatments such as AphasiaScript® and Speech Entrainment have been shown to be effective for improving script production in PWNA. For instance, AphasiaScript® uses repetition of sentences or phrases from personalized scripts with the aid of real-time feedback (speech unison) and offline feedback from a virtual speaker. Speech Entrainment uses a tablet to deliver prerecorded script production of a proficient human speaker to engage PWNA during speech unison. Speech Entrainment with audiovisual or audio-only entrainment was more effective than script production without entrainment and both forms of entrainment were more beneficial for people with nonfluent aphasia than those with fluent aphasia. For their initial study, the inventors used a computerized script-based approach for treatments, and used smartphones to allow for greater flexibility and better convenience compared to tablet-based treatments.

For these studies, the inventors used speaking rate of accurate script produced, and introduced speech initiation latency as a measure of effortful language production. Speaking rate and speech initiation latency of accurate utterances were assessed in terms of the percent of sentence produced within a script, because it would take PWNA a shorter duration to produce an inaccurate sentence (e.g., four or five words out of ten words compared to a longer duration to produce nine out of ten words). This shows that the speaking rate for the inaccurate utterance is likely to be higher than the speaking rate for the accurate utterance. The inventors used speaking rate and speech initiation latency of accurate utterances only to control for this confound. In addition, the inventors targeted speaking rate because it affects persons with both fluent and nonfluent variants of aphasia.

Study Design. The inventors used a cross-over single case experimental design, where each participant received two treatments sequentially. The treatments focused on script production; one with recursive self-feedback and a control training i.e., non-self-feedback script-based treatment. The control training approximates the standard script training but with no interaction and feedback from an SLP. The order of the treatments was counterbalanced across the two participants, as shown in the study protocol flow charts of FIG. 1A and FIG. 1B, respectively.

Participants The inventors recruited two adults (AE2: 6 years poststroke and AE3: 12 years poststroke), right-handed dominant speakers of American English, diagnosed with chronic nonfluent aphasia. Both participants met the following inclusion criteria: (i) mild-severe aphasia, secondary to a single stroke with relative ability to comprehend and comply with instructions during the screening interview and during treatment; (ii) premorbid dominant speakers of English as assessed by a language history self-report; (iii) no record of concomitant neurological disorders, such as dementia and neurodegenerative disorder (iv) normal or corrected to normal vision and hearing (v) no record of significant acquired neuromotor disorders; (vi) no more than minimal difficulty with pronunciation due to motor deficits (apraxia of speech). Both participants signed a written consent form after the inventors discussed the contents of the form with them. The consent form was approved by the Institutional Review Board of the City University of New York before commencing the experiment. The participants were recruited from Speech and Hearing Clinic at Lehman College, City University of New York in New York City.

Assessments The inventors used the Western Aphasia Battery Revised (WAB-R: Kertestz, 2007) to assess the type and severity of aphasia. The inventors used the Cognitive Linguistic Quick Test Plus (CLQT+: Helms Estabrooks, 2001) to screen for general cognitive deficits. The screening was done by an SLP with experience working with people with aphasia. Table 1 shows that AE2 had mild aphasia and AE3 had moderate aphasia. Both participants had relatively more difficulty with production tasks than comprehension tasks on the WAB and no significant cognitive impairments (Table 1). Through the aid of two SLPs, each participant completed a self-report, both reporting no concomitant neurological and uncorrected visual and hearing disorders.

TABLE 1

Demographics of initial study participants.

| Participants | Gender | Age | Education | Language Spoken | WAB Measures | CLQT + Composite Severity Score for Aphasia Administration |
|---|---|---|---|---|---|---|
| AE2 | Female | 50 | College (BS) | American English* Spanish | Fluency, grammatical competence and paraphasia: 6/10 Spontaneous speech: 14/20 Auditory comprehension: 9.85/10 Speech repetition: 10/10 Naming: 7.3/10 Aphasia Quotient: 82.3 | 39 (absence of nonlinguistic cognitive impairment) |
| AE3 | Male | 53 | College (MS) | American English* | Fluency, grammatical competence and paraphasia: 6/10 Spontaneous speech: 13/20 Auditory comprehension: 9.33/10 Speech repetition: 7.6/10 Naming: 7.1/10 Aphasia Quotient: 74.1 | 35 (mild nonlinguistic cognitive impairment) |

Treatment The inventors used smartphone-based script treatments, administered through a mobile audio app the inventors developed and deployed using the Unity 2D development game engine (https://unity.com/). The app displays text and delivers automated recursive speech playback of the participants' recorded speech and speech feedback from an external model (a prerecorded virtual speaker). The mobile app treatments allowed the inventors to administer treatment in an ecological setting outside the lab. The inventors used two treatments that involved production of sentences from personalized scripts. (1) Experimental treatment (recursive self-feedback training): participants produced sentences from a script using recursive self-feedback (see details below) vs. (2) Control treatment (control training): participants produced sentences from a script using a non-self-feedback protocol that included elements of script-based treatments, namely speech unison, feedback from an external proficient speaker, and repeated exposure to and production of scripts.

Scripts were personalized: the participants suggested a text or topic of interest to them (e.g., article on basketball). This was used to create two pairs of personalized scripts per participant and each unique pair was used for a specific treatment block. Each participant trained with four personalized scripts across the two treatment blocks. Each script was broken into eight sentences. The words in each sentence were frequently used words that are familiar to the participants. The inventors controlled for the length and complexity of the sentences per script which was determined by each participant's performance after repetition of practice sentences from a non-individualized practice script. The practice script was not used during the treatments or assessment of generalization of treatment effects. Afterwards, the sentences in the personalized scripts were converted to natural speech at a moderate rate using a text-to-speech software (fromtexttospeech.com). The speech and its corresponding text (i.e., sentence), were uploaded to the audio playback app with two versions, one for each of the experimental and control treatments.

Figure 2A:
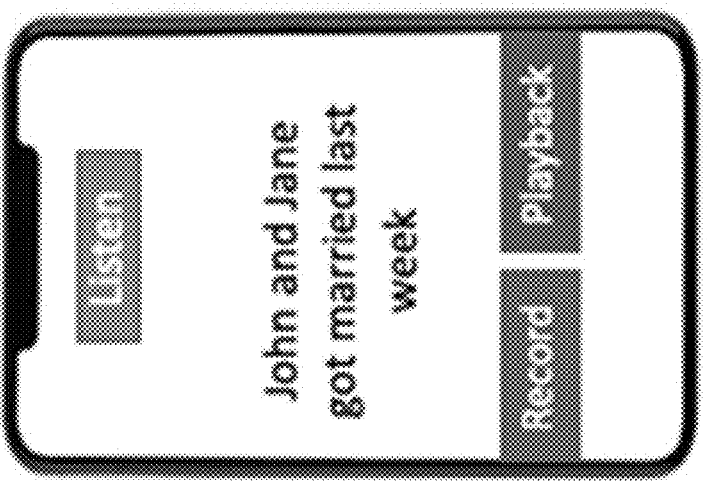

The app fully automated the treatment sequence, switching between visual display of written sentences, audio playbacks and audio recording. A conceptual example of what a participant, patient or user would see in the user interface is depicted in FIG. 2A and FIG. 2B. As shown, the user interface contained buttons for "Listen", "Record" and "Playback" in the initial study, though as described elsewhere it is contemplated that additional functionality and options are contemplated in mobile apps (e.g., including account information, scheduling and rescheduling of sessions, history and progress information, notifications and messages from a healthcare team, options for the user to input metadata, etc.). The app automatically switched between sentences across a script such that the participant does not need to keep track of the number of their repetition attempts. The "Listen" button played the prerecorded audio of the virtual speaker. The "Record" button activated the audio recording of the participants' speech at 44.1 kHz sampling rate during sentence repetition. Recording ended automatically after 16 seconds allotted for the production of each sentence within a script, and no speech sample per utterance could exceed this timeframe. The timeframe was determined by the participants' performance with the practice scripts. The recursive self-feedback version had just one additional "Playback" button (FIG. 2A) compared to the version for the control training (FIG. 2B).

In recursive self-feedback sessions, once the participants pressed the "Record" button (to record their first sentence repetition attempt), the "Listen" button is disabled, and script text was no longer shown. Without an external reference, the participant then repeated the sentence after listening to their previous performance. This was done recursively nine times, each time listening to the most recent repetition attempt. The participants performed ten iterations of each script sentence when the inventors add the first attempt, before self-feedback was provided, as shown in FIG. 3.

The recursive process 300 depicted in FIG. 3, was performed in part by having the software operating on the mobile app 302 record the user's speech and use that recorded speech as the 'input' 304 of the next step, such as done in a telephone game. In other words, for Attempt 1, the user was given a full/correct scripted sentence of "John and Jane got married last week," and the participant/user spoke a sentence produced at Attempt 1. This sentence (however it was uttered by the participant/user) was then played back to the user as the 'prompt' for Attempt 2. (As described above, the user's spoken words from the previous Attempt can be presented back to the user in a variety of ways, such as through transcription or audio playback). This approach allowed user performance to drift in each iteration, until a new sentence was presented. The inventors instructed the participants to monitor and detect production errors in their previous performance and attempt to correct them in their subsequent performance across all iterations. Also, the inventors instructed the participants to begin speaking immediately after they heard a beep when they pressed the record button. The inventors instructed the participants to minimize delay across each iteration of script production. These processes were demonstrated through a practice app for recursive self-feedback training. Afterwards, the participants used the practice app to demonstrate their understanding of how to use the treatment app for recursive self-feedback training.

In further embodiments that were subsequently developed, the inventors developed alternatives to the approach depicted in FIG. 3. For example, in some embodiments, the user's device (whether a mobile device or otherwise) not only records the user's audio but also records video of the user (e.g., the user's face, or video focusing on the user's mouth) as the user is speaking the given attempt. This audiovisual recording can then be played back to the user, so that the user can see their attempt (including mouth movements) as well as hear what they said. In other embodiments, to assist in training the user on spontaneous speech (rather than simply imitation or modeling of a scripted sentence), the user's device may present a question to the user that will elicit a verbal response. For example, the device may utilize a bank of common questions that can be responded to in an expected fashion, such as by reforming the question into a declarative statement that contains an answer: Question: "What is your favorite sport?" Answer: "Basketball is my favorite sport." The question or prompt may be in the form of text, audio, or an audiovisual prompt. In other embodiments, the device may rely on an LLM to generate unique, novel questions to which the user must craft a response. The LLM can then infer what the user meant to say given the context of the question itself.

The non-self-feedback control treatment version of the app only played back the prerecorded speech, and it did not have the "Playback" button (see FIG. 2B). Unlike the experimental version, the "Listen" button and displayed text were disabled only when the participants pressed the "Record" button to record each sentence repetition attempt. This means that these features were enabled after the duration allotted for each repetition attempt was timed out. In this treatment, each participant followed a protocol that approximated script training by including three key steps of script training. First, they read a sentence on the screen of their smartphones, and they listened to the prerecorded audio of the sentence. Secondly, they performed speech unison which involved repeating the sentence in tandem with the prerecorded virtual speaker. Lastly, they independently produce the sentence without support from the prerecorded speaker or written sentence. The participants performed these steps 10 times per sentence for all sentences in the script. The inventors provided the participants with similar instructions used during recursive self-feedback training except the one that pertained the use of their self-feedback for improving their performance. Here, too, they demonstrated their understanding of the protocol through a practice version of the control training.

Both treatments were administered through the participants' smartphones at the comfort of the participants' homes. AE2 received control training first which was followed by recursive self-feedback training. The inventors counterbalanced the order across the participants and AE3 first received the recursive self-feedback training, followed by the control training (FIG. 1). The inventors checked in with the participants twice per week to remind them about the treatment procedure and for any bug in the app. The inventors performed in-person and remote check in before the COVID-19 pandemic, and remotely using Zoom during the pandemic. Each participant used both treatments for two hours per day, seven days a week for about three weeks. For each treatment block, the participants were required to train with the first and second personalized scripts for 8 to 11 days consecutively to accommodate a level of flexibility. There was a minimum of two weeks for washout between the two treatment blocks. The inventors determined treatment fidelity by requesting the participants to keep a diary of the days and times they practiced with the app. However, as discussed above, in further embodiments the application running on the users' mobile devices would automatically record and log such information, and manual recording would not be needed. In this study, the inventors were also able to obtain this information from the app which generated it automatically.

Assessment of Outcome Measures. The inventors calculated the outcome measures, speaking rate and speech initiation latency, from each participants' speech data during the administration of the treatments. The inventors analyzed speech data from all sessions. The inventors estimated direct treatment effects by comparing the participants' speech outcome measures on the first day of treatment with that on the last day of treatment. Generalization of treatment effects was tested through sentence repetition of new, non-personalized scripts. The length and complexity of each sentence was matched with what was used in the personalized scripts for the treatments. Each script included 16-18 sentences, and each sentence was repeated five times. These were administered three times at each of four testing time: at the baseline phase and the posttreatment phases per treatment block. To estimate for generalization of treatment effects, the inventors administered to each participant the same non-personalized script in all assessment phases across both treatments. The baseline and posttreatment assessments of generalization of treatment effects were performed in-persons in the lab before the pandemic and remotely via Zoom during the pandemic.

Figure 4:
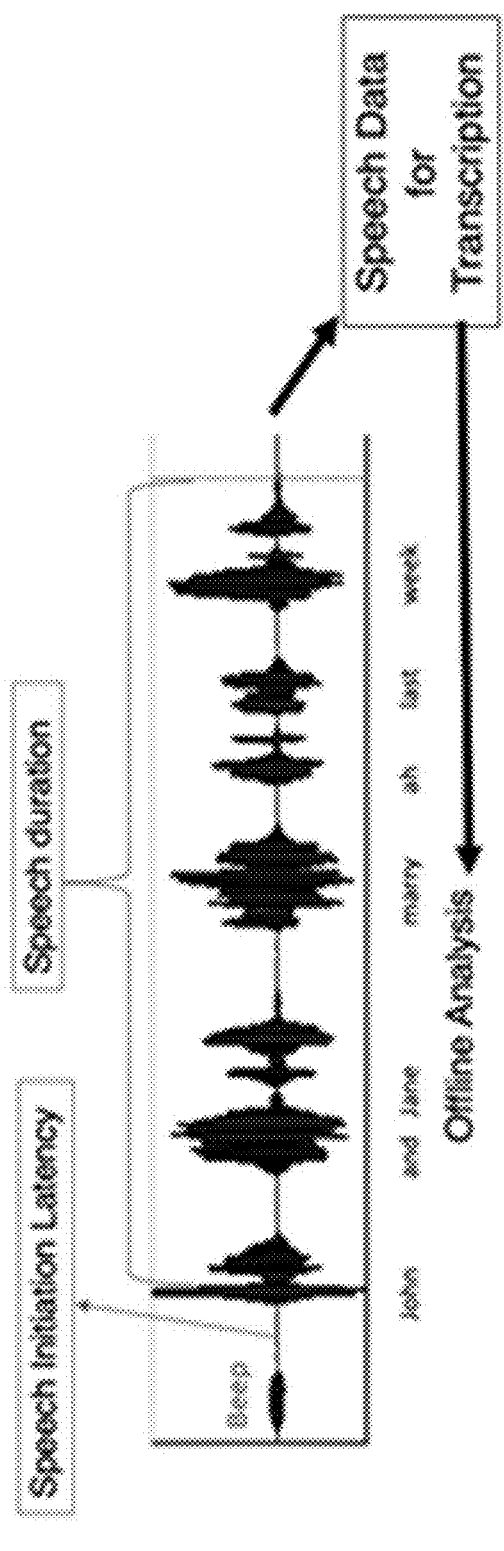
FIG. 4 is a graph of speech signal corresponding to a user response and associated assessments made in association with a study conducted by the inventors.

The inventors manually transcribed the speech data to text (though, of course, untrained or trained speech to text applications may also be used). All transcriptions were done by an SLP with experience analyzing language production of PWNA. The data used for estimating the direct and generalization of treatment effects were transcribed twice (blinded transcription) and inter-rater reliability assessments were done as well. The inventors derived the speech initiation latency and the speech duration from the speech samples through the Praat method, as depicted in FIG. 4. Speech initiation latency is the latency in milliseconds (ms) between the end of the beep sound and the start of the speech signal. The inventors did not include false starts as the beginning of a sentence. Speech duration (ms) is the time course of the speech signal including pauses, fillers, word errors and speech repetitions.

$$\text{Speaking rate} = \frac{\text{Number of correct words produced}}{\text{Speech duration (ms)}} \times 60$$

The inventors analyzed the transcribed utterances (i.e., sentences produced within a script) that were 90% accurate relative to the modelled sentence. About 97% of the total utterances (i.e., 7,492 out of 7,700) were accurate. No script trial was discarded. The inventors used a Python script to compute the speaking rate i.e., words per minute (wpm) through the derived speech duration and transcribed text data. To calculate speaking rate, the inventors divided the total number of correct words in a sentence by the speech duration, multiplied by 60. Correct words produced were words produced correctly in the correct order as represented in the original sentence and devoid of semantic errors and neologisms. Mild phonemic errors were ignored; for example, errors of phoneme omission, substitution, and addition (e.g., September [(/p/omitted)] for September). If there were repeated words or phrases, only the first word or phrase was considered correct. The inventors used the total duration of all utterances that met the 90% threshold to compute the speaking rate, which included the duration of word errors, fillers or repetitions that were excluded from determining correct words produced. The inventors performed an inter-rater reliability of transcribed correct words produced by determining the ratio of agreement between two independent raters on 10% of randomly selected speech samples used for estimating direct and generalization of treatment effects. A score approaching 100% implies a complete match between both raters scores. The inter-rater scores for both participants (AE2 and AE3) are described as follows: AE2 recursive self-feedback training: trained scripts (96%); AE2 control training: trained scripts (99%); AE2 recursive self-feedback training: untrained scripts (98%); AE2 control training: untrained scripts (97%); AE3 recursive self-feedback training: trained scripts (94%); AE3 control training: trained scripts (99%); AE3 recursive self-feedback training: untrained scripts (95%); and AE3 control training: untrained scripts (99%).

Descriptive Trend Analysis. The inventors performed a descriptive trend analysis using the slope-intercept form (y=mx+b) to examine the trend of improvement during the duration of both treatments. The inventors manually transcribed and analyzed speech samples from each participant's script repetition attempt for each session across both treatments. The inventors used systematic sampling to select speech samples from each participant's first completion of a trained-personalized script in each session over the duration of the two treatments.

The inventors analyzed 1,650 speech samples (per session: 79, SD: 3.53) from the duration of recursive self-feedback treatment and 1,472 speech samples (per session: 74, SD: 16.57) from the duration of the control training treatment for AE2. As for AE3, the inventors used 1,390 speech samples (per session: 77, SD: 3.32) from the duration of recursive self-feedback treatment and 1,244 speech samples (per session: 78, SD: 7.45) from the control training treatment. The inventors used speech samples from each participant's production of untrained scripts during the pre- and post-treatment phases to estimate the generalized treatment effects. Note, each participant did not practice with the untrained scripts during either treatment. The inventors used 398 and 471 speech samples from AE2's production of an untrained script during the control training and recursive self-feedback blocks respectively. As for AE3, the inventors used 534 and 333 speech samples from his production of the untrained script from the control training and recursive self-feedback blocks respectively. This makes a total of 7,492 speech samples, out of a total of 7700, that were analyzed in this study. Thus, only ~3% of the data which are randomly distributed across both intervention phases were discarded.

A positive trend in speaking rate i.e., increase in speaking rate following each session of an treatment, means a gradual improvement in speaking rate over time. In contrast, a decrease in speaking rate following each session suggests worsening performance over time. A decline in the trend of latency i.e., speech initiation latency following each session suggests a gradual improvement in reducing effortfulness in producing speech. Whereas an increase in speech initiation latency as a function of the number of sessions suggests a gradual increase in effortfulness for the participants in producing speech.

Statistical Evaluation of Direct Treatment Effects. The inventors evaluated the overall direct treatment effects by using nonoverlap of all pairs (NAP) to compare each participant's speech outcome measures on the first day of each treatment block (the first day of the first trained script) with their outcome measures on the last day of the treatment block (the last day of the second trained script). The inventors computed the NAP effect size based on a 95% confidence interval and a p-value <0.05. The NAP effect size ranges between 0-1 where 0.5 is the null value due to matched overlap between both phases of assessment. The inventors used the following ranges of effect sizes to classify the degree of improvement. Weak effect: 0.5-0.65; moderate effect: 0.66-0.92; and strong effects: 0.93-1. The inventors used the 'SingleCaseES' package version 0.4.3 on R to compute the NAP effect size for the direct treatment effects per participant. The inventors computed the nonoverlap of all pairs effect size with a 95% confidence and a p-value lesser than 0.05.

Statistical Evaluation of Generalized Treatment Effects. The inventors estimated the generalized treatment effects by comparing each participants' performance on an untrained non-personalized script before the start of a treatment with their performance on the same script after each treatment. The inventors collected measures for estimating generalization of treatment effects three times per testing period during both treatment blocks. The generalized treatment effects of the treatments on speech initiation latency and speaking rate were estimated using NAP. The inventors used the same software package and applied the same parameters the inventors used for estimating the direct treatment effects.

Results. The inventors analyzed changes across sessions in speaking rate and speech initiation latency for the two participants with chronic aphasia when producing trained and untrained scripts, comparing recursive self-feedback training to control training. First, the inventors report trends for each participant and then the inventors report our findings for direct and generalized effects of the treatments per participant.

Figure 5:
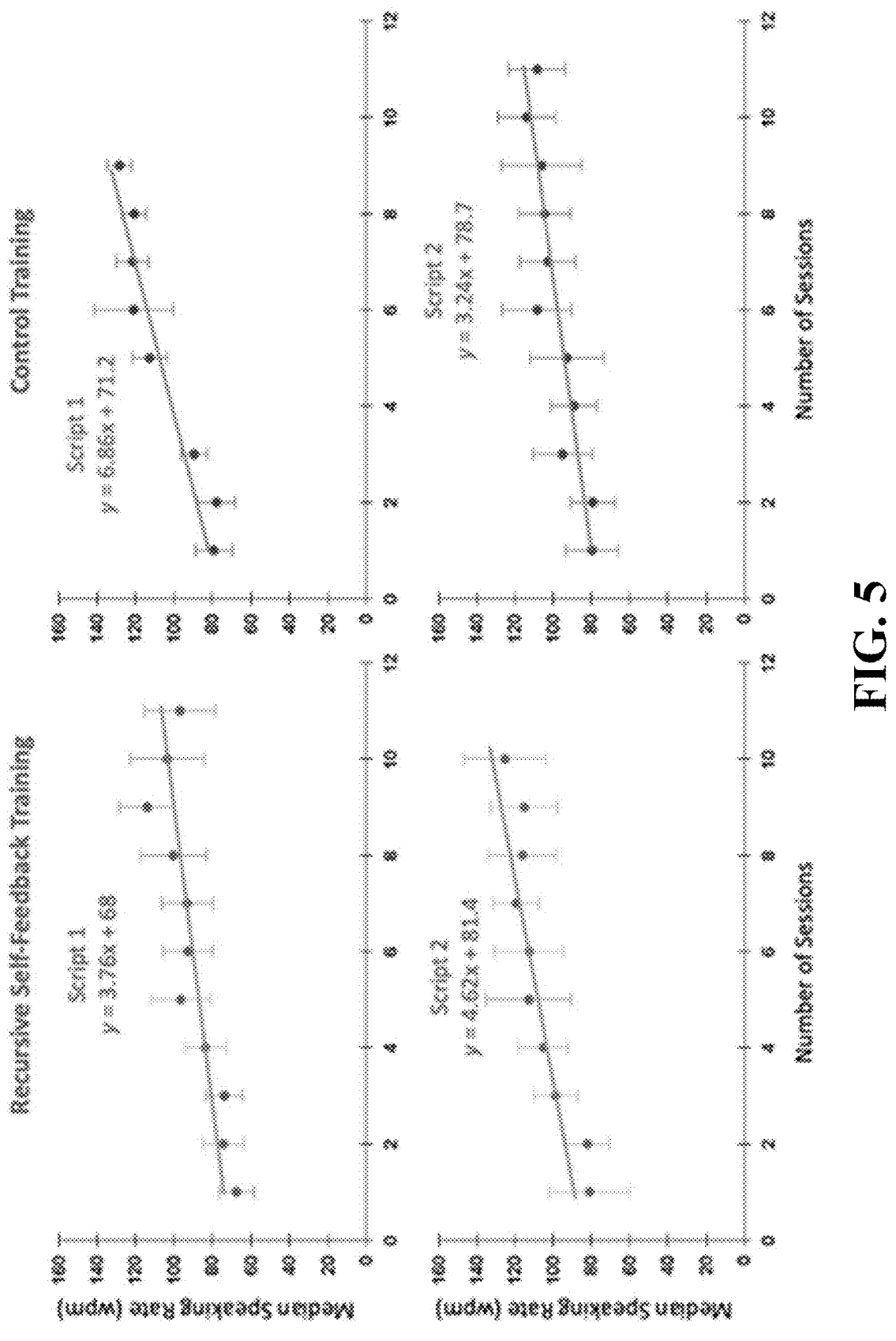
FIG. 5 is a set of graphs of results of a study conducted by the inventors.

FIG. 5 is a set of graphs that shows the trend of participant AE2's speaking rate across all sessions of the two treatments. The figure shows a positive trend of speaking rate due to recursive self-feedback training in both script 1 ($y=3.76x+68$) and script 2 ($y=4.62x+81.4$). Similarly, the control training led to a positive slope in speaking rate in script 1 ($y=6.86x+71.2$) and script 2 ($y=3.24x+78.7$). These results suggest that AE2 improved her speaking rate over time across all the scripts during both recursive self-feedback training and the control training.

Figure 6:
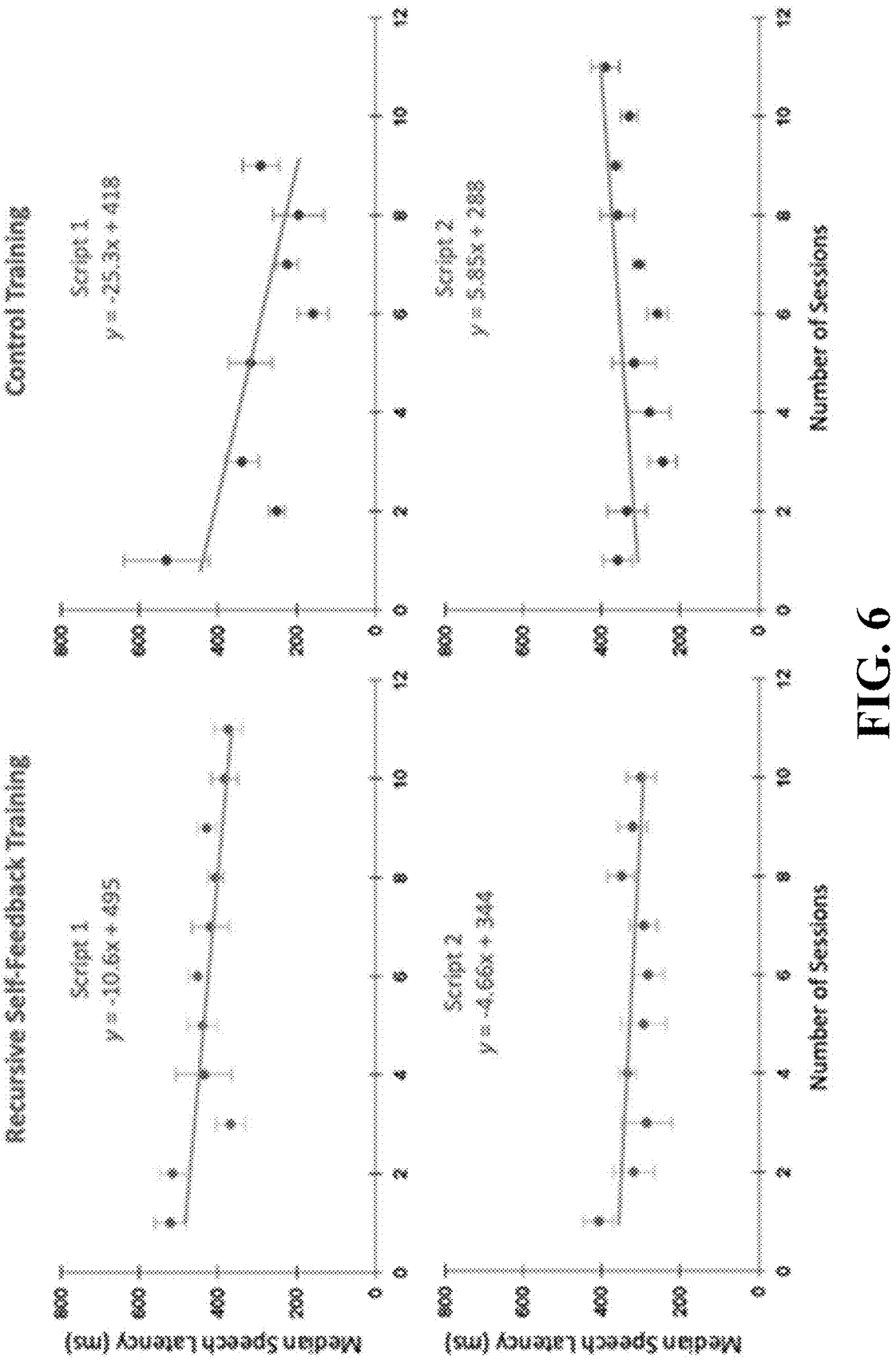
FIG. 6 is a set of graphs of results of a study conducted by the inventors.

Speech initiation latency showed consistent negative trends in recursive self-feedback training in both script 1 ($y=-10.6x+495$) and script 2 ($y=-4.66x+344$). For control training, the trends were inconsistent i.e., $y=-25.3x+418$ for script 1 and $y=5.85x+288$ for script 2, as shown in FIG. 6.

Figure 7:
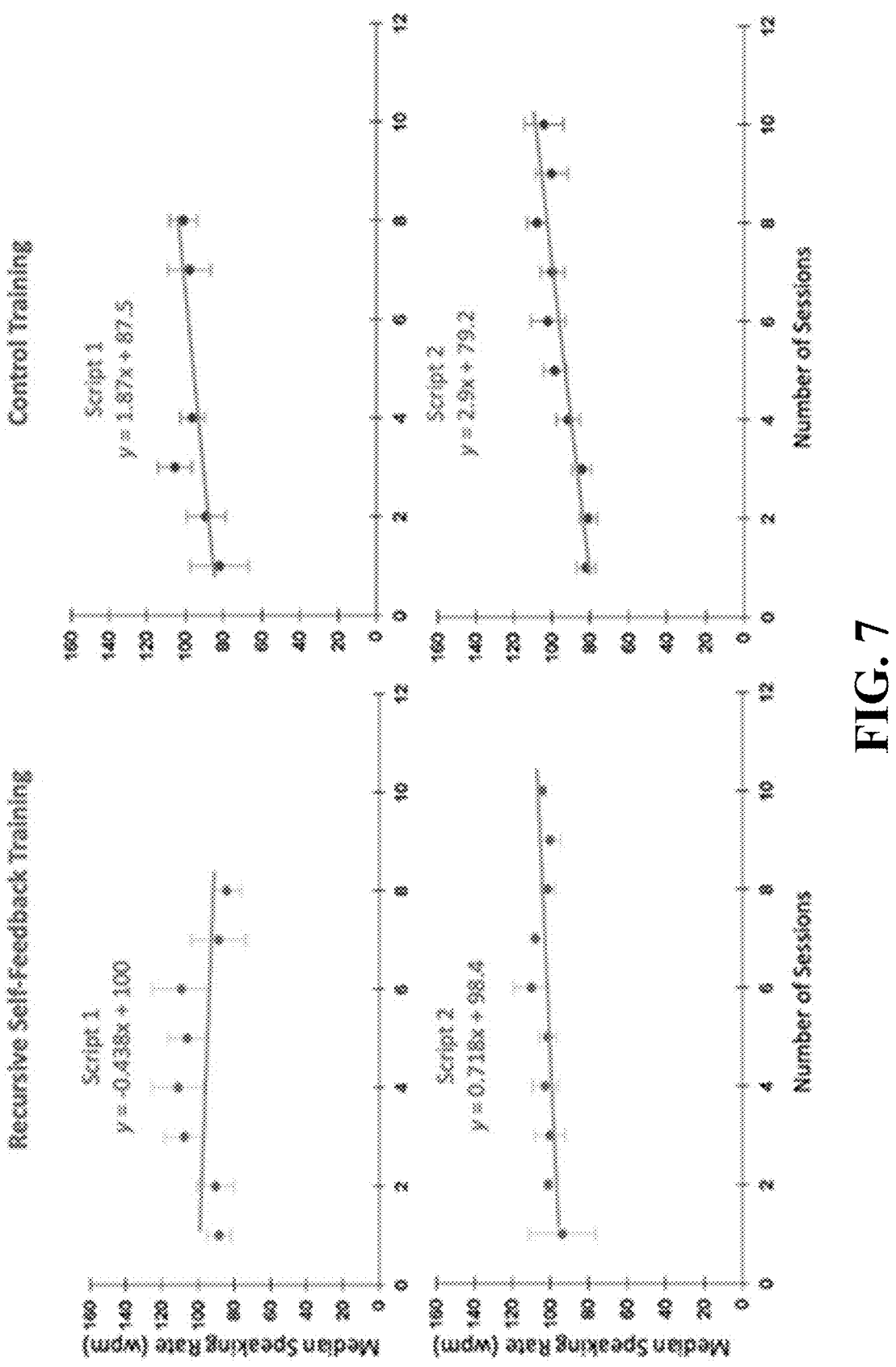
FIG. 7 is a set of graphs of results of a study conducted by the inventors.

Participant AE3 showed inconsistent changes in speaking rate during recursive self-feedback sessions for script 1 ($y=-0.438x+100$) and script 2 ($y=0.718x+98.4$). However, control training improved speaking rate in both scripts i.e., $y=1.87x+87.5$ and $y=2.9x+79.2$ for scripts 1 and 2 respectively, as shown in FIG. 7.

Figure 8:
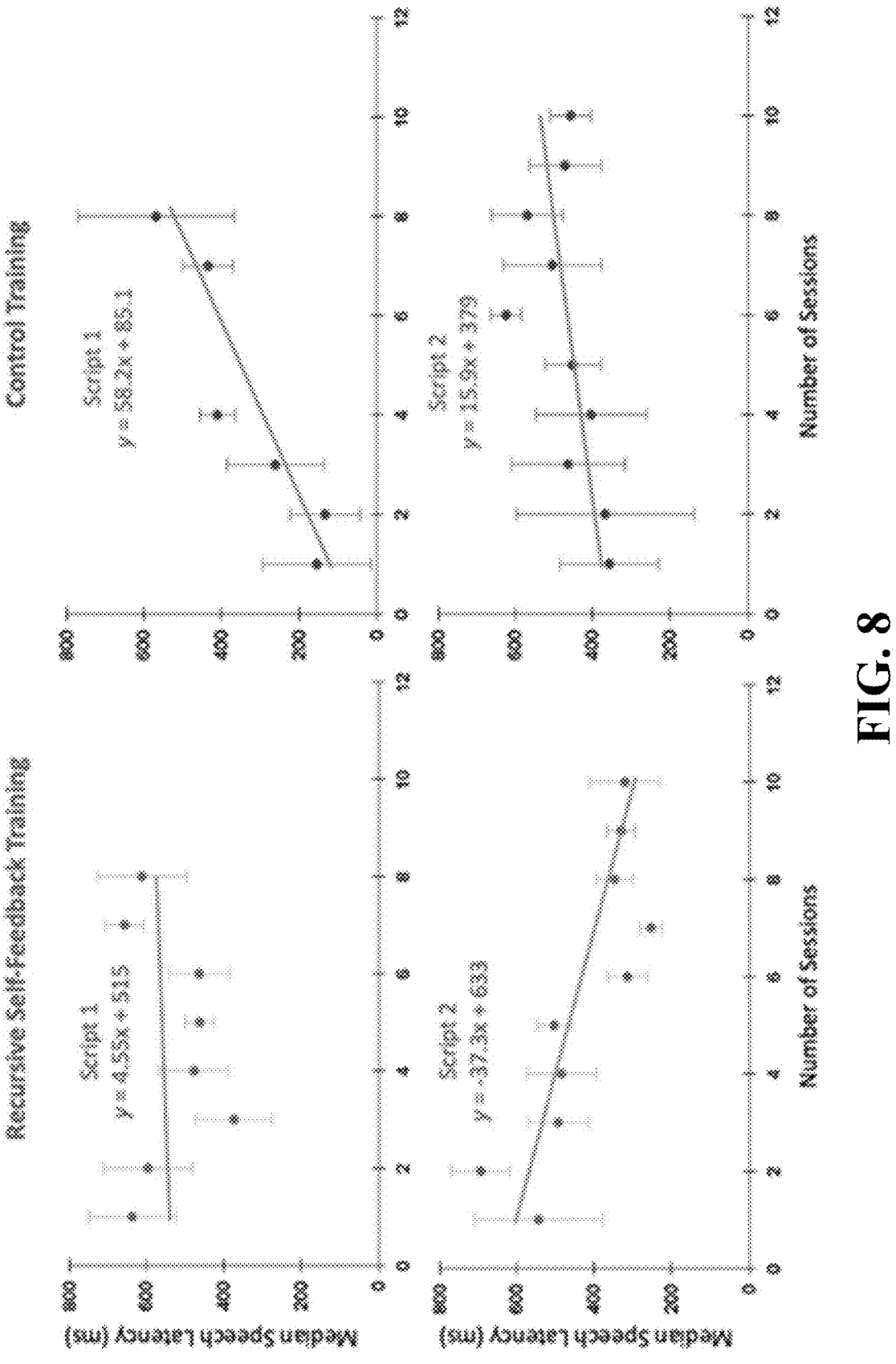
FIG. 8 is a set of graphs of results of a study conducted by the inventors.

Finally, recursive self-feedback training led to inconsistent slopes in speech initiation latency ($y=4.55x+515$ and $y=-37.3x+633$), whereas in the control training the inventors observed a deterioration in speech initiation latency ($y=58.2x+85$ and $y=15.9x+379$) in participant AE3, as shown in FIG. 8.

Taken together, with recursive self-feedback, slopes show improvement in 6/8 measures, and similarly with the control training slopes show improvements in 6/8 measures, indicating an overall positive outcome in both treatments. The inventors next evaluated the effect size of each treatment based on these measures.

Figure 9:
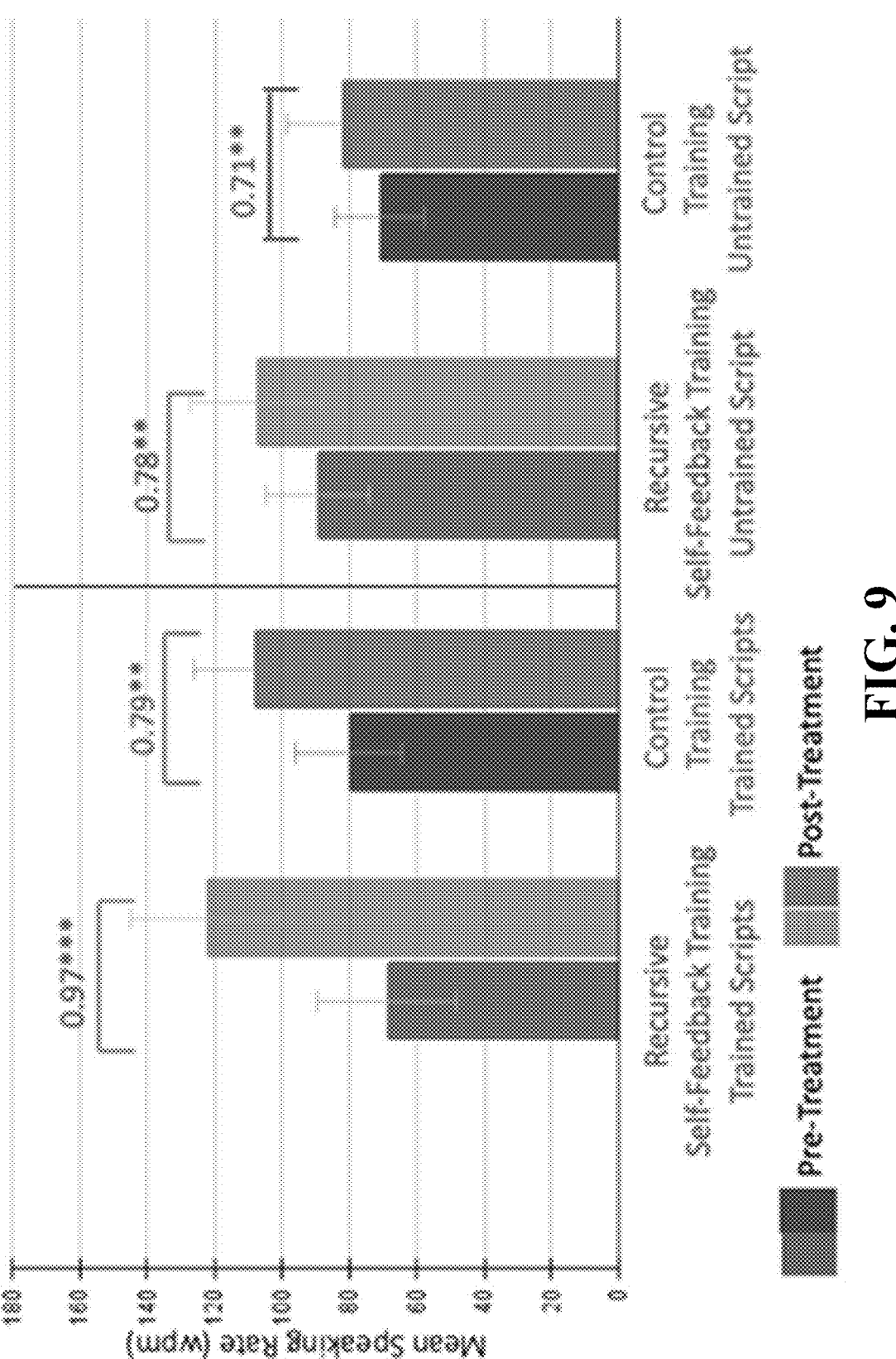
FIG. 9 is a chart of results of a study conducted by the inventors.

Effect Size of Both Treatments on the Primary Outcome Measures. The results show that AE2 improved her speaking rate following both recursive self-feedback training and control training i.e., non-self-feedback training (FIG. 9). For AE2, the nonoverlap of pairs effect size estimate (NAP) shows that recursive self-feedback resulted in a strong direct treatment effect (NAP=0.97, SE=0.01, p<0.05) on speaking rate while the control training resulted in a moderate direct treatment effect training (NAP=0.79, SE=0.05, p<0.05) on speaking rate. Similarly, recursive self-feedback training led to moderate improvement (NAP=0.78, SE=0.21, p<0.05) in speaking rate of untrained script while the control training improved speaking rate of untrained script moderately (NAP=0.71, SE=0.027, p<0.05). Note that in both cases, the effect size of recursive self-feedback training was slightly stronger than that of the control training.

Figure 10:
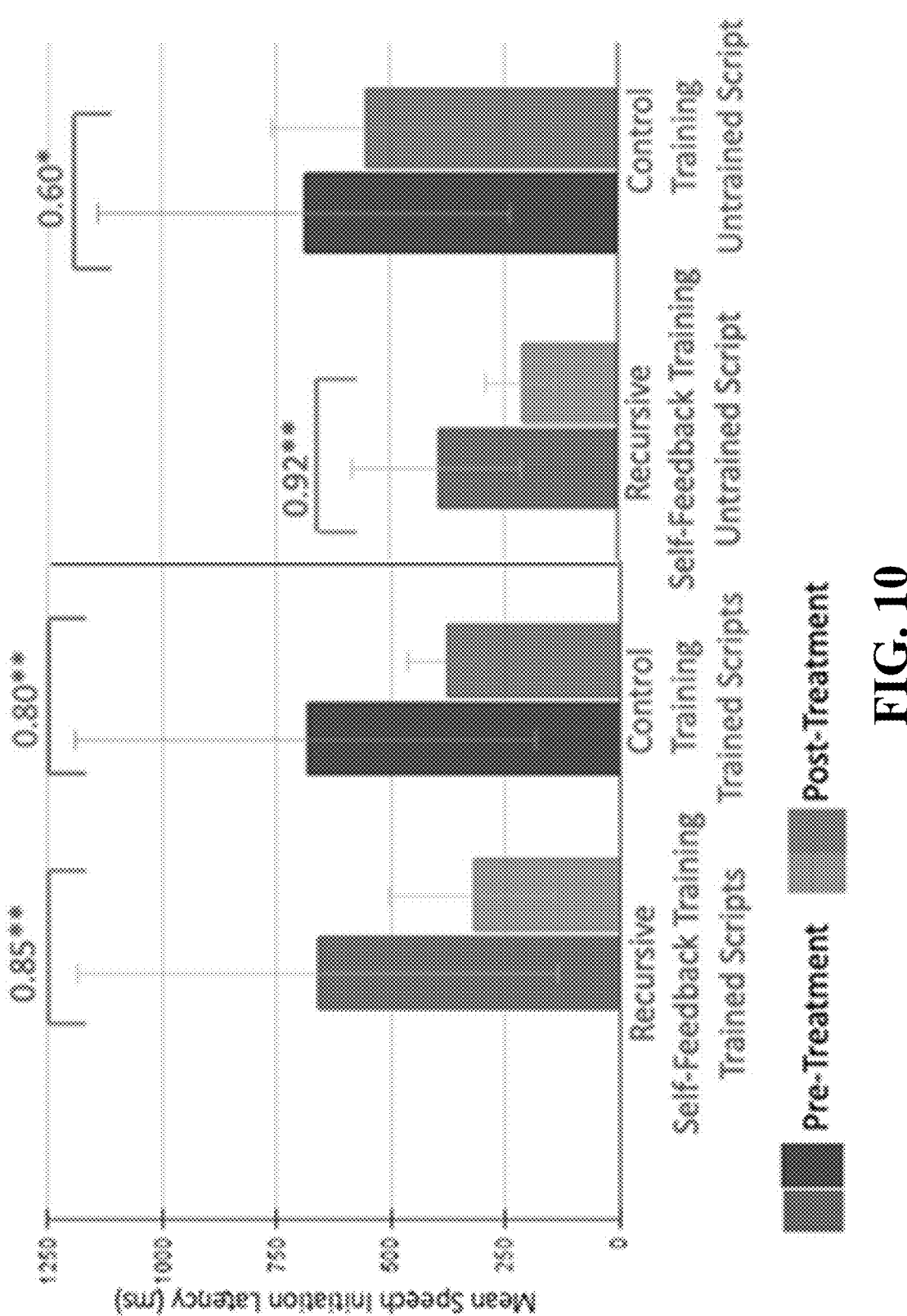
FIG. 10 is a chart of results of a study conducted by the inventors.

Participant AE2 improved her speech initiation latency in both the trained and untrained scripts after both treatments (FIG. 10). Specifically, recursive self-feedback training (NAP=0.85, SE=0.031, p<0.05) and the control training (NAP=0.80, SE=0.036, p<0.05) resulted in moderate improvement in speech initiation latency during repetition of trained scripts. There was strong improvement in speech initiation latency during repetition of untrained scripts following recursive self-feedback training (NAP=0.92, SE=0.14, p<0.05). Whereas the control training (NAP=0.60, SE=0.031, p<0.05) resulted in mild generalized effects on speech initiation latency to untrained scripts. Here too, in both cases, the effect size of recursive self-feedback training was slightly stronger than that of the control training.

Figure 11:
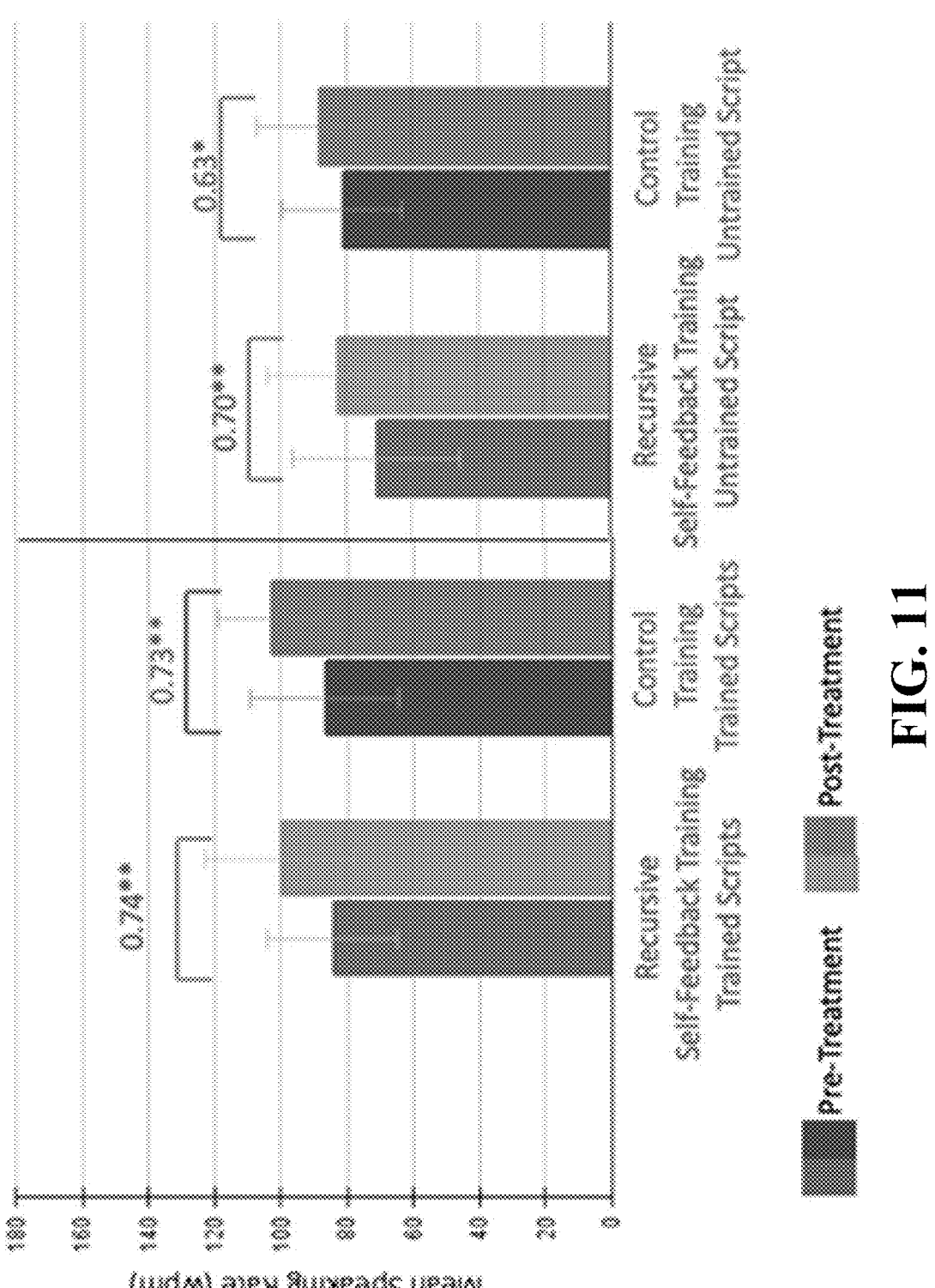
FIG. 11 is a chart of results of a study conducted by the inventors.

Participant AE3 improved his speaking rate (FIG. 11) in both the trained and untrained scripts following both recursive self-feedback training and the control training. For the trained scripts, recursive self-feedback training (NAP=0.74, SE=0.042, p<0.05) and the control training (NAP=0.73, SE=0.05, p<0.05) showed moderate effect sizes which suggest that AE3 benefitted from both treatments. Furthermore, FIG. 10 shows that recursive self-feedback training led to a moderate generalization of improvement (NAP=0.70, SE=0.029, p<0.05) in speaking rate following production of untrained scripts. Control training led to mild improvement in his speaking rate of producing sentences in the untrained script (NAP=0.63, SE=0.024, p<0.05). Overall, in both cases, the effect size of recursive self-feedback training was slightly better than the control training.

Figure 12:
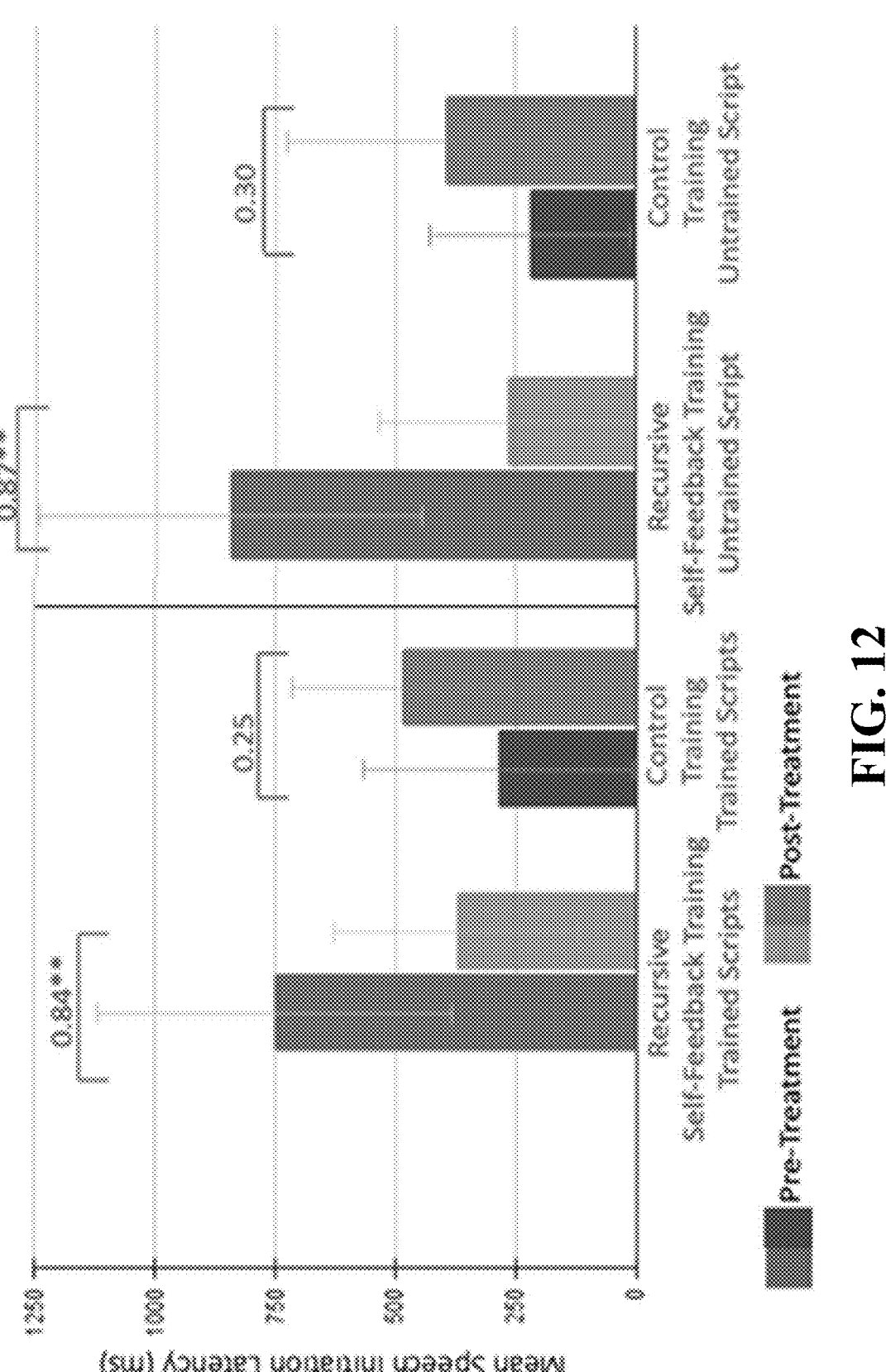
FIG. 12 is a chart of results of a study conducted by the inventors.

FIG. 12 shows that AE3 improved his speech initiation latency in both the trained and untrained scripts following recursive self-feedback training. However, he did not improve in this measure in both the trained and untrained scripts following the control training. Specifically, recursive self-feedback training led to improvements in speech initiation latency in the trained script (NAP=0.84, SE=0.033, p<0.05) and untrained script (NAP=0.87, SE=0.021, p<0.05). However, the control training did not improve speech initiation latency in the trained scripts (NAP=0.25, SE=0.05, p<0.05) and the untrained script (NAP=0.30, SE=0.023, p<0.05). Here, in both cases, the effect size of recursive self-feedback training was stronger than that of the control training.

Discussion The aforementioned study was an initial study for proof of principle to examine whether people with nonfluent aphasia (PWNA) can self-improve the fluency of their language production when producing scripts following treatment with recursive self-feedback. (As described below, several further studies validate and support these findings).

The inventors thus established that PWNA improved their fluency of language production when producing scripts following both protocols: recursive self-feedback training and non-self-feedback script-based treatment. PWNA have difficulties with language production, characterized by slow and effortful production, and impaired speech feedback mechanism for real-time monitoring and improvement of their language production. Recursive self-feedback provides PWNA the opportunity and sufficient time window to optimize and use only their self-feedback for improving their language production. The trend analysis showed that recursive self-feedback training and the control training largely resulted in improved speaking rate and speech initiation latency when producing scripts, which were maintained during the duration of the treatments. The inventors' findings on the effects of recursive self-feedback training supported that PWNA have a relatively preserved speech feedback system, which is compromised for real-time feedback, but which may be augmented by their preserved cognitive system and be useful for postproduction feedback.

The inventors' findings on the overall direct treatment effects of the two treatments show that both participants generally improved their speaking rate and speech initiation latency when producing scripts, but one participant (AE3) did not improve his speech initiation latency following the control training. That recursive self-feedback training induced improvement in speaking rate when producing scripts could be because recursive self-feedback provides a sufficient time window for the participants to monitor their prior production and improve their subsequent performance. Also, both treatments started with an externally modeled script production from a proficient (virtual) speaker which could have influenced positively the participants speech outcomes.

As well, these results show that script-based treatments may be beneficial for mitigating effortfulness in language production through a decrease in speech initiation latency. And, these findings suggest that PWNA can improve their language production during production of personalized trained scripts using only self-feedback. In part, their ability to improve their language production through our recursive self-feedback procedure stems from the increased time window for self-feedback during this procedure. This allowed PWNA more time to recruit cognitive non-linguistic processes such as self-monitoring and executive function for performance error detection and correction. These processes may compensate for their poor real-time production feedback system and facilitate their linguistic task performance, which shows that recursive self-feedback uses self-feedback loops to optimize recursively multiple subsystems (e.g., cognitive non-linguistic and linguistic subsystems) that PWNA engage to facilitate task performance. This learning mechanism is called recursive functional learning.

Improvements in speech initiation latency and speaking rate generalized to untrained scripts in both participants, although one participant (AE3) only improved his speaking rate, and not speech initiation latency, during production of an untrained script following the control training. Recursive self-feedback training provided opportunities for both participants to monitor and improve both speech outcome measures which was not emphasized in the control training. This could be a reason why participant AE3 did not improve his speech initiation latency in neither the trained nor untrained scripts after receiving the control training. In addition, these findings also showed that PWNA can improve the fluency of their language production without speech unison, a fluency-promoting condition which is an integral and active component of script-based treatments. Furthermore, recursive self-feedback induced improvements in PWNA script production despite not providing iterations of errorless, written scripts for imitation. Repeated exposure of errorless, written scripts is also an active ingredient of script-based treatments and was part of the control training. The inventors' findings show that speech unison and increased exposure to errorless written materials may be optional ingredients for script-based treatments for people with mild to moderate aphasia.

This study provided preliminary evidence on the sole use of self-feedback to improve speaking and speech initiation latency during production of scripts in two persons with moderate-mild chronic nonfluent aphasia. Recursive self-feedback isolates the unique role of self-feedback in facilitating aphasia recovery.

Following this initial study, the inventors performed similar studies that corroborated their findings, further establishing that the methods and systems described herein that employ recursive self-feedback techniques represent an improvement over externally-focused forms of speech therapy, due in part to a variety of novel aspects and benefits of the various embodiments described herein.

Impact of mHealth Approach on Speech Production. The inventors conducted a study to further evaluate RSF-based therapy versus external feedback-based therapy, in terms of their relative impact on improving speech production in PWNA. In this study, the inventors utilized an integrated mobile health (mHealth) approach, using two custom-developed mobile applications to guide participants through various types/durations of speech therapy remotely at their homes or other chosen locations outside of a clinic or therapy center. The study employed a crossover design, where participants underwent two sequential treatment blocks, one using RSF-based training and the other using external feedback-based training. Participants performed therapy sessions as dictated, guided, and delivered by the applicable mobile application, using mini tablets, over a period of 2-3 weeks per treatment type, with two-hour daily sessions. The study aimed to determine whether RSF-based therapy outperformed external feedback-based therapy in terms of improving a set of attributes of speech production that were measured by the mobile apps: speech fluency, speaking rate, and speech initiation latency, while also assessing how a mobile app could provide real-time insights into patients' usage, adherence, and preferences relative to the mobile app.

The custom mobile application played a meaningful role in this study, with two distinct versions designed to deliver the RSF and external feedback conditions separately. The RSF app version allowed participants to record their own speech, play it back, and iteratively refine their production over multiple attempts. Each sentence from the scripted speech training was repeated eight times per prompt, with seven rounds of self-correction loops using automated playback to facilitate self-monitoring. The external feedback app version, in contrast, presented participants with a synthesized speech model using Wideo text-to-speech software, providing them with a correct version of the sentence after each attempt instead of self-generated playback. Both versions of the app were programmed to log usage data regarding the participants' efforts and results. In the study, the apps stored data that allowed the inventors to track the participants' engagement, frequency and duration of training sessions, timing of pauses between iterations, and overall compliance with the study protocol. This data enabled the inventors to monitor adherence remotely and analyze how different users approached RSF versus external feedback training. In other embodiments, however, it is contemplated that mobile apps that employ the methods and techniques described herein will record a variety of information regarding the participants' usage and therapy including: particular words, phrases, sentence structures, utterances, etc. that are misspoken frequently, pace of speech, volume of speech, tone of voice, and other information and statistics regarding the speech performance of the patient-user; full audio recordings of the user's speech, transcripts of the user's attempted and actual speech; performance metrics over time, such as error rate, time to complete sentences, pauses, etc.; metadata regarding the therapy sessions, such as geographic location, time of day, date, physiological information (such as blood pressure, heart rate, temperature, etc., including changes in these attributes during the therapy session), participant state of 'stress' versus 'relaxation', and the like. Moreover, the apps may be programmed to provide this information to a therapist, clinician, or other healthcare provider for review on an ongoing basis, and allow the healthcare team to remotely adjust settings for future therapy sessions, such as speech-specific criteria like sentence length and complexity, difficulty of words, frequency of words or phrases the patient is known to struggle with, frequency of various phonemes, etc.; session-specific criteria like spacing, timing, total daily duration, time of day, number, and duration of sessions; correction-related criteria, such as how many iterative attempts a patient is required to (or permitted to) undertake before moving on (either because a new script is provided or an external correction is given); recommendations for breaks or washout periods; etc.

The results of the study revealed that both feedback approaches improved participants' speech fluency, but RSF-based approaches unexpectedly demonstrated superior generalization effects, particularly in speaking rate and speech initiation latency. Participants using RSF-based therapy also exhibited more sustained improvements, with better carry-over of learned-improved speech behaviors to new, previously-unattempted scripts, whereas those receiving external feedback-based therapy improved more quickly at first but showed less retention. The mobile app data further revealed that participants having undergone recent RSF-based therapy engaged in more varied, self-directed training behaviors, taking longer pauses between iterations and adjusting self-corrections dynamically. This suggests that the RSF approach allowed for deeper cognitive processing, leading to more durable speech improvements over time.

The inventors concluded that RSF outperformed external feedback because it encourages active self-monitoring, error detection, and iterative refinement. Unlike external feedback, which relies on external correction models, RSF places the burden of correction on the participant, fostering greater engagement, ownership, and awareness of their own speech errors. Additionally, the ability to pause, listen, and retry multiple times appears to have strengthened learning retention, enabling participants to develop greater autonomy in speech correction, as compared to external feedback approaches in which the full correction is given right away. Given the effectiveness of RSF-based speech training and the success of mobile health integration, the inventors determined that RSF-based therapies are amenable to full automation, such as via AI-assisted aphasia treatment programs, which can be deployed even without direct monitoring or prescribing by a healthcare professional, so as to improve accessibility for individuals who lack direct access to speech-language pathologists.

Impact on Sentence Production Efficiency. The inventors conducted a study of human subjects, to evaluate how recursive self-feedback (RSF)-based approaches compare to external feedback in terms of their relative influence on sentence production efficiency of patients with non-fluent aphasia (PWNA). Unlike previous studies that focused solely on feedback mechanisms, this research investigated how practice schedules (continuous vs. discontinuous practice) affect the benefits achievable with RSF vs external feedback, with an aim to determine how to optimize protocols and therapeutic training schedules to improve speech outcomes. The study aimed to determine whether allowing flexible, spaced practice schedules could enhance the effectiveness of RSF in comparison to traditional external feedback-based speech therapy.

Using a crossover study design, four PWNA participated in two treatment blocks-one with RSF and one with external feedback—where the treatment schedule varied between continuous (intensive) or discontinuous (spaced) practice schedules. RSF participants iteratively refined their speech by listening to and correcting their own previous productions, while external feedback participants received corrective speech models. The inventors measured the participants' speaking rate, which was analyzed to assess sentence production efficiency over time. Participants used a custom mobile application for speech practice at home, enabling automated tracking of practice schedules and speech production metrics.

This study's results demonstrated that RSF-based methods (such as disclosed herein) paired with a discontinuous (spaced) practice schedule resulted in more sustained long-term improvements as compared to external-based methods and/or RSF-based methods with continuous practice schedules. Based on review of these results, the inventors determined that a discontinuous/spaced practice schedule caused RSF participants to better consolidate what they were learning and optimize their own speech correction over time.

More specifically, the study examined how training schedule type influenced the effectiveness of recursive self-feedback (RSF)-based methods vs external feedback-based methods in speech therapy for PWNA. In the study, the inventors allowed the participants to choose between continuous (intensive) or discontinuous (spaced) practice schedules for each treatment block. (However, if is of course, contemplated that various systems and methods herein might instruct users to perform their training on specific spaced schedules, as described below, without necessarily giving the participants the option to self select a scheduling scheme). In the continuous practice schedule, participants were instructed to undergo their at-home training by completing a single two-hour session all at once, at one point during the day, so as to engage in uninterrupted training. In contrast, the discontinuous practice schedule allowed participants to distribute their two-hour practice across multiple sessions throughout the day, such as one hour in the morning and one hour in the evening, or four 30-minute sessions spread over different time periods. The inventors observed natural variability in how participants structured their spaced practice; while some maintained a consistent pattern of dividing their practice into two equal sessions per day, others varied their schedules day-to-day, opting for shorter or longer breaks between sessions based on personal preference. Regardless of the specific adherence by participants to a routine for the discontinuous therapy sessions, the study found that RSF-based programming was most effective when combined with discontinuous, spaced practice. In other words, instructing users, or at least encouraging or reminding them, to allow for meaningful breaks between therapy sessions results in enhanced learning retention, and also resulted in participants being able to invest more time in self-monitoring their speech improvements.

Accordingly, in some embodiments, a system or method may encourage users to spread out their training over the course of several sessions during the day. In some instances, this may entail prompting a user to select times of day at which the user would like to have a pop up notification or other reminder to begin a short training session, or resume an incomplete session. A suggested format may also be provided at this initial (or weekly/daily) set up phase, such as: two 1-hour trainings per day, in the morning and evening; or four half hour sessions, two in the morning and two in the evening; or other similar divisions. Such systems may also allow users to dynamically adjust their schedule on a day by day basis, such as through mobile device calendar integrations, a dedicated app, or the like.

Impact on Generalization/Improvement Transfer. The inventors also conducted another study to assess the generalization effects of the techniques and approaches described herein, including methods and systems that deploy recursive self-feedback (RSF) based therapy for individuals with aphasia. In this study, the inventors assessed how much RSF-based therapy could cause general improvements in connected speech production in individuals with chronic nonfluent aphasia. The study aimed to determine whether recursive self-feedback alone, without external guidance, could improve speech production and transfer those improvements to new speech tasks. The researchers compared RSF-based therapy to external feedback-based script training (which uses repeated providing of speech models generated by external sources).

To evaluate the effectiveness of RSF, the study employed a crossover design involving four individuals with chronic nonfluent aphasia. Participants underwent two different therapeutic phases: script production with recursive self-feedback and script production with external feedback. In the RSF therapy phase, participants listened to their own recorded speech and refined their production in multiple iterative attempts. In the external feedback condition, participants were instead provided with corrective speech models from an external source after each attempt. Both treatments were delivered remotely through mobile applications, allowing participants to practice independently at home. Each treatment lasted two to three weeks, with participants practicing for two hours per day, five days per week.

The results indicated that both treatments led to improvements in connected speech production, but RSF demonstrated superior enhancement in several microlinguistic measures. Participants showed greater gains in sentence completeness, grammatical accuracy, and speech informativeness after undergoing the RSF-based therapy protocol as compared to the external feedback-based therapy. While external feedback initially led to rapid improvements, RSF exhibited better generalization effects; for example, the participants transferred their learned speech skills more effectively to novel speech tasks beyond the trained scripts.

The results of this study demonstrate that RSF-based therapy outperformed external feedback-based therapy. The superior performance derives, at least in part, to certain aspects of the RSF-based therapy, such as its reliance on self-monitoring and iterative refinement. In other words, because the RSF-based therapy used in this study emphasized allowing individuals to take an active role in their own speech correction, RSF is able to encourage stronger cognitive engagement and long-term retention of speech improvements.

Contemplated Embodiments

The techniques, technologies, algorithms, and advantages described herein may be implemented in a variety of practical applications, which may serve to improve systems and methods used or performed by several different individuals, companies, and/or institutions involved in speech therapy, mHealth, aphasia treatment, cognitive therapy, and the like.

In one category of embodiments, systems and methods may be configured to function as a tool to improve the ability of healthcare providers to give tailored care to their patients in a prompt and efficient manner. Thus, such embodiments may involve provider portals that allow providers to adjust settings, monitor progress and adherence, and ensure that routine treatment is available to their patients outside of the clinic, via mobile, adaptive, and effective delivery approaches. These embodiments may include enriched features for allowing providers and patients to communicate and coordinate the delivery of speech therapy on an ongoing basis, such as private messaging, posting results and feedback, and coordinating adjustments to settings and analysis of trends and outliers.

Alternatively, or additionally, the systems and methods describe above may be embodied in a more user-driven implementation, that relies on automated logic and/or an AI agent to suggest prescription settings and updates based on user capability and progress. Thus, in such embodiments, a provider portal may not necessarily be utilized, and instead settings, feedback, and overall management and guidance of therapy may be performed according to prewritten logic. For example, as a user develops a given proficiency, the system automatically increases difficulty. Or, as the system detects a user struggling with given phonemes or sentence constructs, a LLM may be utilized to give variations of those troublesome aspects via new scripts that correlate with personal interests.

Figure 13:
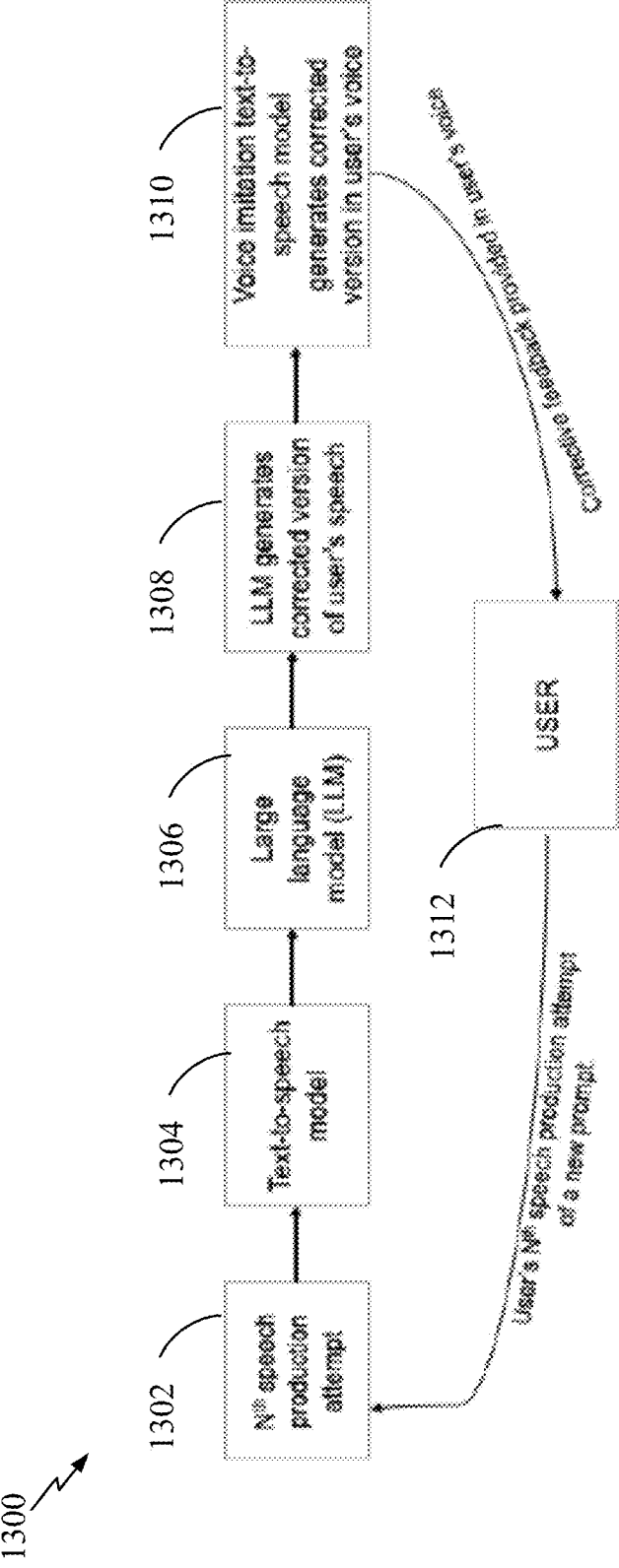
FIG. 13 is a conceptual flow diagram of data flowing among the user and modules of a speech therapy system according to some embodiments.

Referring now to FIG. 13, a flowchart 1300 is shown which illustrates a method employing a related concept, also involving use of an LLM. In an iterative fashion, a user 1312 speaks an Nth production attempt of a given script, which becomes input 1302 to a speech to text model 1304. The processed output is prompted to an LLM 1306, which generates a further output 1308 that is a corrected version of the user's speech. That text output 1308 is the passed to a voice imitation model that has been trained in the user's voice, which generates an audio output of the corrected text in the user's own voice, which is recursively played back to the user 1312. In addition, the raw/uncorrected audio of the user's actual Nth speech production attempt may also be played back to the user, before or after the corrected speech, or instead of the corrected speech, or either can be played upon user request (which involves the user cognitively becoming engaged in determining their own treatment structure as of the Nth, Nth+1, Nth+x attempt at which the user may decide to stop iterating). In further embodiments, the LLM 1306 may be prompted to identify the types of errors that the user is making, and categorize them by a set of predefined criteria such as types of sentence structures, particular word sequences, or words with given phonemes or phoneme sequences. In other embodiments, a secondary neural network may group errors together in an unsupervised fashion and develop hallmarks of user errors without being limited to predefined categories. Based on the user's types of errors, the system can generate scripts to be spoken by the user that emphasize and encourage correction of these common errors.

Figure 14:
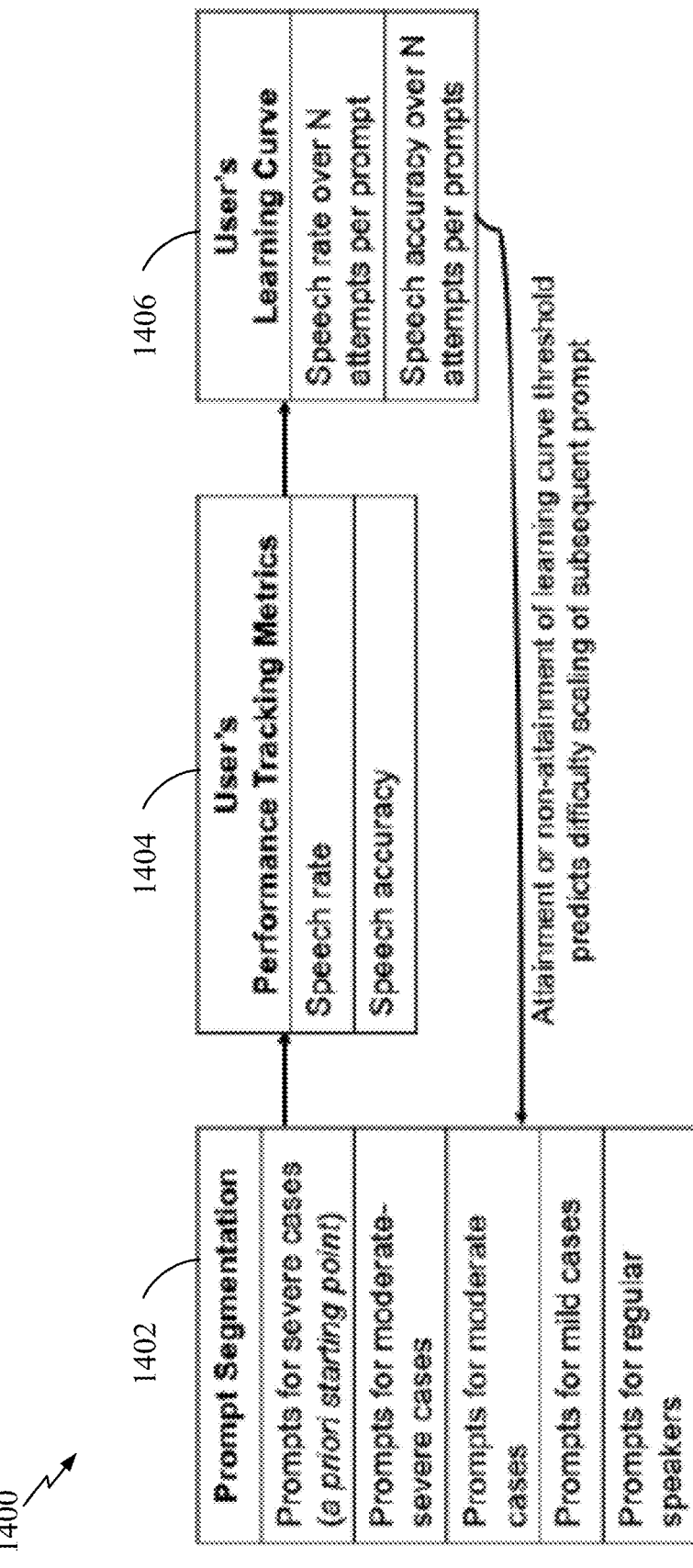
FIG. 14 is a conceptual depiction of database storage of prompts and performance information used in association with some embodiments.

Referring now to FIG. 14, in certain embodiments software running on the user's mobile device or a connected resource (e.g., cloud or remote server) may automatically and adaptively adjust the type or characteristics of the scripts, questions, and/or prompts provided for the user which are intended to elicit spoken responses. Thus, in some embodiments, an adaptive adjustment routine 1400 may be employed. A database 1402 may be provided that contains information describing prompt segmentations. In some cases, the prompt segmentations may include banks of increasingly-difficult or complex scripts or prompts so that a user's therapy sessions can match a user's improvement. In other cases, the prompt segmentations may instead include prompts that would be provided to an LLM to dictate attributes of scripts or user-prompts that it should generate. The level of difficulty or complexity can be determined based upon a user profile that contains performance tracking metrics 1404. These metrics may be assessed as described above with respect to the inventors' studies, or may include predefined factors that can readily be quantified and evaluated automatically by a software application (e.g., running locally on the user's device). For example, speech rate and speech accuracy may be metrics that are evaluated, and based upon a normalized scaling of the user's performance, different levels of prompts may be selected from the prompt segmentation database 1402. Additionally, a user's metrics may be utilized to determine a learning curve 1406 or improvement profile. In such embodiments, rather than provide the user with scripts or prompts that fall within a given level, the user's curve can take into account pace of improvement and utilize the user's performance over time to adjust percentages of prompts or scripts that are chosen from multiple prompt segmentation levels.

In the foregoing specification, implementations of the disclosure have been described with reference to specific example implementations thereof. It will be evident that various modifications may be made thereto without departing from the broader spirit and scope of implementations of the disclosures as set forth in the following claims. The specification and drawings are, accordingly, to be regarding in an illustrative sense rather than a restrictive sense.

What is claimed is:

1. A method for providing recursive self-feedback (RSF)-based speech therapy comprising:
   loading a user profile, the user profile comprising settings relating to providing recursive self-feedback-based speech therapy;
   determining a speech prompt to provide to the user as part of the speech therapy, based at least in part on the settings relating to providing RSF-based speech therapy;
   communicating the speech prompt to the user, via a local computing device;
   recording a first audible response attempt spoken by the user in response to the speech prompt;
   determining at least one of an accuracy or a speech performance metric of the first audible response attempt relative to an expected speech response;
   determining that, based on a first accuracy or speech performance metric, a mode of response should be generated from which the user can engage in recursive self-feedback;
   generating a first feedback response based on the first audible response attempt, the first feedback response including at least one of: an audio recording of the user's first audible response attempt, a text representation of the user's first audible response attempt, or a synthetic response derived from the user's first audible response attempt;
   communicating the first feedback response to the user via the computing device;
   recording a second audible response attempt spoken by the user in response to the first feedback response;
   determining that, based on a second accuracy or speech performance metric, a mode of response should be generated from which the user can engage in further recursive self-feedback regarding the speech prompt;
   generating a second feedback response based on the second audible response attempt, the second feedback response including at least one of: an audio recording of the user's second audible response attempt, a text representation of the user's second audible response attempt, or a synthetic response derived from the user's second audible response attempt;
   recording a third audible response attempt spoken by the user in response to the second feedback response;
   adapting subsequent speech prompts or recursive feedback iterations based on analysis of the third audible response attempt; and
   storing session data in association with the user profile to track therapy progress over time.

2. The method of claim 1, wherein the user profile further comprises therapy scheduling data, and the method further comprises generating reminders or notifications to prompt the user to engage in more than one scheduled therapy session per day according to the scheduling data.

3. The method of claim 1, wherein determining the speech prompt comprises selecting the speech prompt based on at least one of a therapy prescription input by a healthcare provider, prior user performance data stored in association with the user profile, or a predefined speech training logic of a software application monitoring speech analyses of the user's speech attempts.

4. The method of claim 1, wherein the first feedback response further comprises at least one of a visual representation comparing text of user's first audible response attempt with text of the expected response, a phoneme similarity score between the first audible response attempt and the expected response, a synthesized playback of the expected response mimicking the user's voice, or a modified playback of the first feedback response having a filtering applied to improve clarity of the user's voice or a reduced speed to emphasize the user's actual spoken words.

5. The method of claim 1, wherein generating the first or second feedback response further comprises dynamically selecting a feedback mode based on at least one of prior user accuracy trends, detected patterns in speech improvement, or an adaptive learning algorithm configured to personalize feedback intensity and duration.

6. The method of claim 1, wherein determining that a mode of response should be generated from which the user can engage in recursive self-feedback comprises evaluating at least one of a threshold accuracy score that is not met by the first or second audible response attempt, an analysis of response timing indicating hesitation or delay, an identification of phonetic, grammatical, or fluency errors detected in the user's response, or a predetermined minimum number of feedback iterations set by a therapy prescription or adaptive system settings.

7. The method of claim 1, wherein the speech prompt is communicated to the user via at least one of a graphical user interface displaying a textual representation of the speech prompt, an auditory playback of a pre-recorded model speech output, or a virtual speech assistant generating a real-time spoken prompt.

8. The method of claim 1, wherein the second feedback response comprises an interactive prompt configured to guide the user through corrective speech training.

9. The method of claim 1, wherein the computing device logs session data, the session data comprising at least one of total session duration, number of recursive feedback cycles completed, frequency and severity of speech errors detected, timestamps of user engagement with speech therapy prompts, or measures of fluency improvement across multiple sessions.

10. The method of claim 1, further comprising:
   generating a report of user therapy session activity, including adherence data, user engagement information, and summarizing user performance metrics; and
   transmitting the report to a healthcare provider for remote analysis.

11. The method of claim 10, further comprising receiving information relating to updates to the settings from the healthcare provider, and updating the user profile accordingly to implement the updated settings in future therapy sessions of the user.

12. The method of claim 1, wherein adapting subsequent speech prompts or recursive feedback iterations comprises implementing variations in future prompts to give them characteristics previously unseen by the user in therapy sessions to improve generalization of learned speech patterns.

13. The method of claim 1, wherein the settings comprise scheduling requirements configured to encourage a spaced training schedule by distributing speech therapy sessions across multiple time intervals per day.

14. The method of claim 1, further comprising adapting content of speech prompts in accordance with at least one of: user interest information of the settings, or content of a web page, article, or social media post being viewed by the user via the computing device.

* * * * *